United States Patent
Masten, Jr.

(10) Patent No.: US 11,390,552 B1
(45) Date of Patent: Jul. 19, 2022

(54) THERMOPHYSICAL FLOAT GLASS PROCESS

(71) Applicant: James W. Masten, Jr., Everett, WA (US)

(72) Inventor: James W. Masten, Jr., Everett, WA (US)

( * ) Notice: Subject to any disclaimer, the term of this patent is extended or adjusted under 35 U.S.C. 154(b) by 0 days.

(21) Appl. No.: 17/525,818

(22) Filed: Nov. 12, 2021

(51) Int. Cl.
*C03B 18/18* (2006.01)
*C03B 27/03* (2006.01)
*C03B 25/02* (2006.01)
*C03B 18/20* (2006.01)

(52) U.S. Cl.
CPC .............. *C03B 18/18* (2013.01); *C03B 18/20* (2013.01); *C03B 25/025* (2013.01); *C03B 27/03* (2013.01)

(58) Field of Classification Search
CPC ........................ C03B 18/02–22; C03B 18/18
See application file for complete search history.

(56) References Cited

U.S. PATENT DOCUMENTS

| | | | | |
|---|---|---|---|---|
| 1,553,773 | A * | 9/1925 | Heal | C03B 18/02 65/182.3 |
| 3,342,574 | A * | 9/1967 | Jewell | C03B 18/18 65/32.5 |
| 3,539,320 | A * | 11/1970 | Delzant | E06B 7/231 65/182.3 |
| 3,607,193 | A * | 9/1971 | Bourggraff | C03B 18/22 65/182.3 |
| 3,652,250 | A * | 3/1972 | Brichard | C03B 18/18 65/182.3 |
| 3,684,475 | A * | 8/1972 | Bondarev | C03B 25/093 65/182.3 |
| 3,794,477 | A * | 2/1974 | Farabaugh | C03B 18/04 250/342 |
| 3,798,017 | A * | 3/1974 | Classen | C03B 18/18 65/346 |
| 3,809,543 | A * | 5/1974 | Gaskell | C03B 18/22 501/63 |
| 3,954,432 | A * | 5/1976 | Hummel | C03B 18/18 65/65 |
| 4,092,140 | A * | 5/1978 | Cerutti | C03B 18/18 65/182.3 |
| 4,197,106 | A * | 4/1980 | Trevorrow | C03B 18/18 65/182.3 |
| 4,380,463 | A * | 4/1983 | Matesa | C03B 3/02 65/182.1 |
| 2009/0217705 | A1* | 9/2009 | Filippov | C03B 17/067 65/99.1 |
| 2017/0113963 | A1* | 4/2017 | Kim | C03B 29/08 |

FOREIGN PATENT DOCUMENTS

JP 06167377 A * 6/1994 ............. C03B 18/02

* cited by examiner

*Primary Examiner* — Erin Snelting

(57) ABSTRACT

A novel apparatus and method for producing flat glass by floating molten glass on liquid tin, significantly improving the efficiency of heating the tin and reducing or eliminating the need to anneal by eliminating the stress introduced by pulling the glass across the tin bath. The apparatus directly heats and melts the tin by exposure to high-intensity infrared energy through surfaces of the tin-containing tub, said tub made from a material that is transmissive at selected infrared wavelengths.

20 Claims, 16 Drawing Sheets

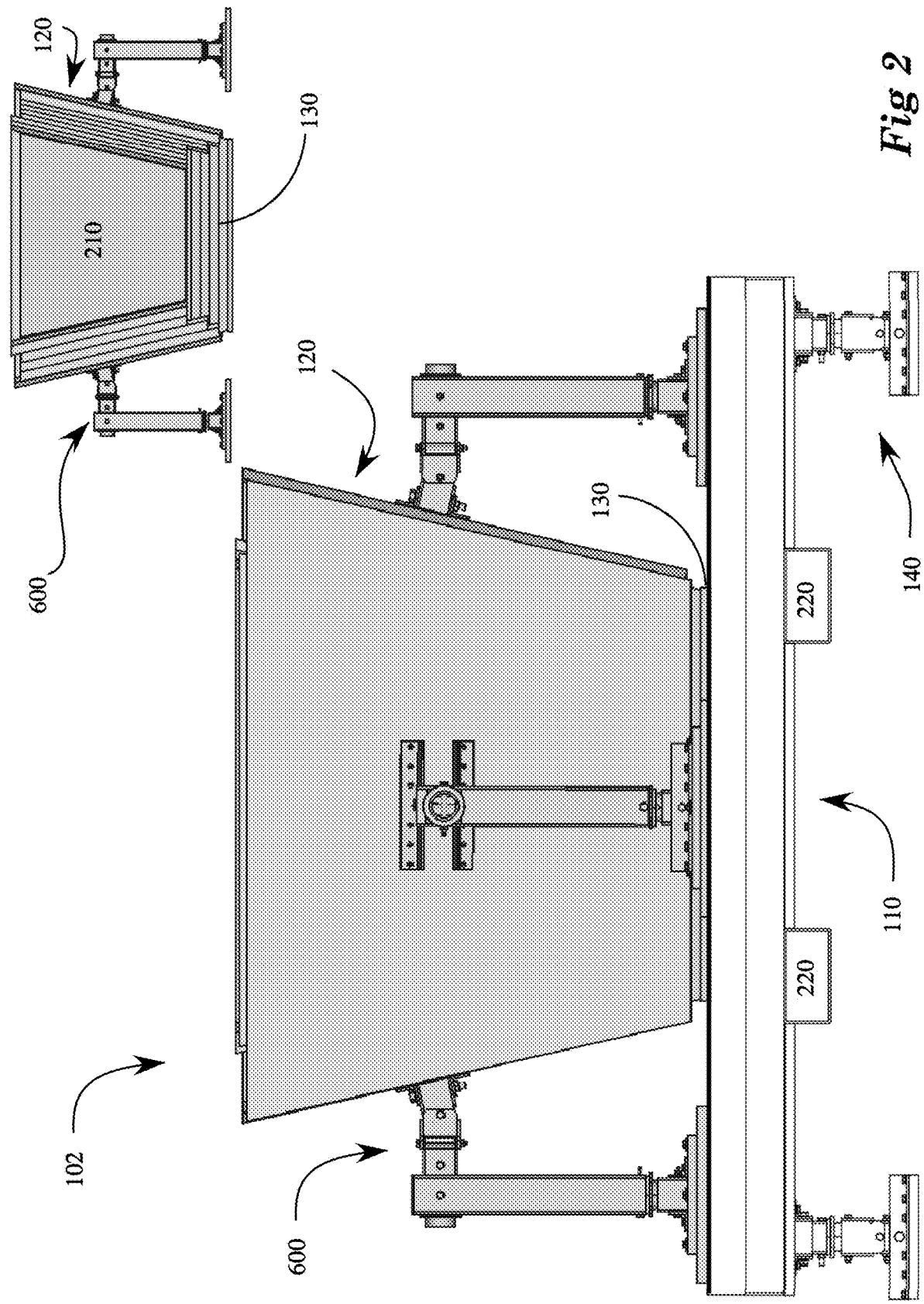

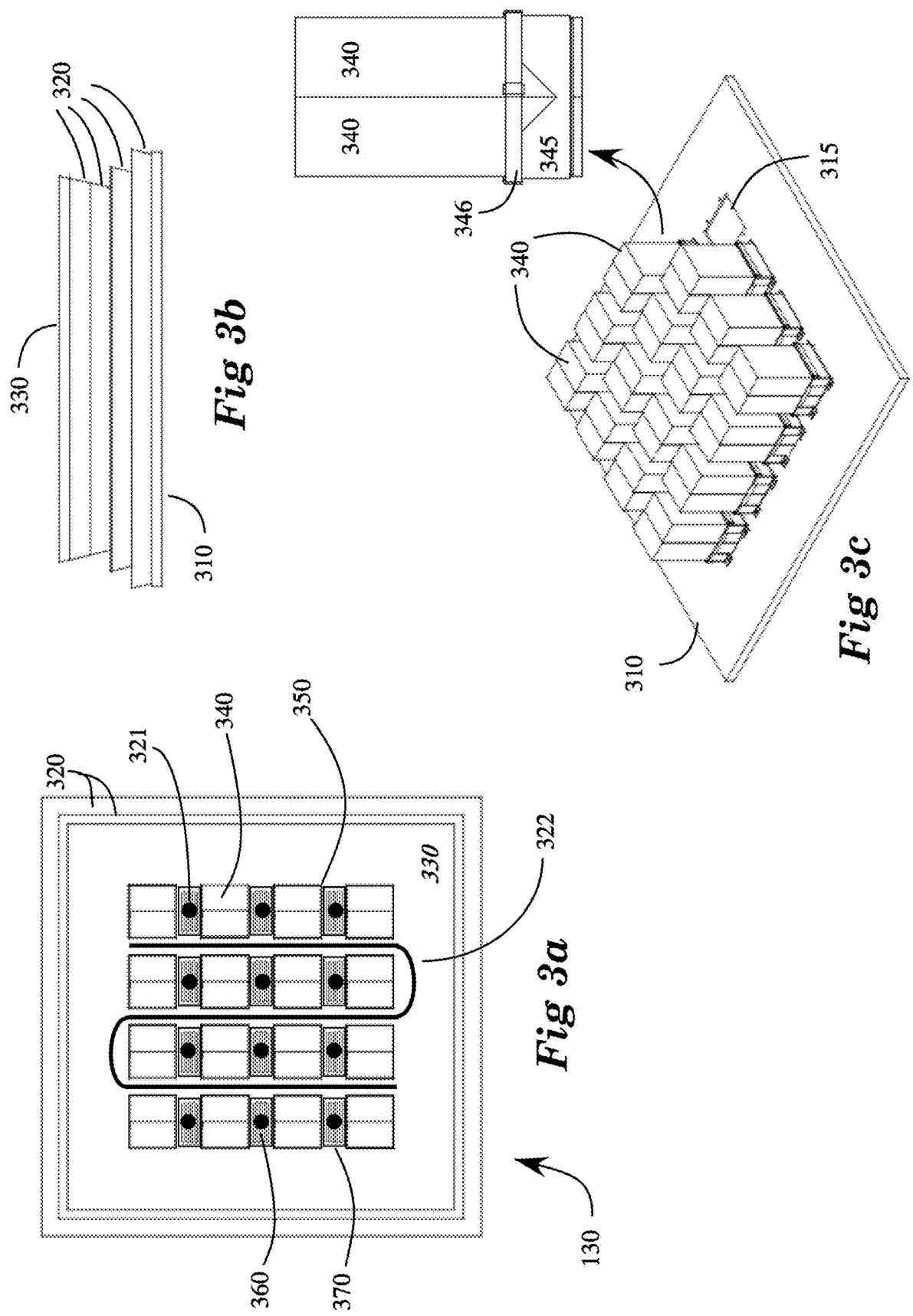

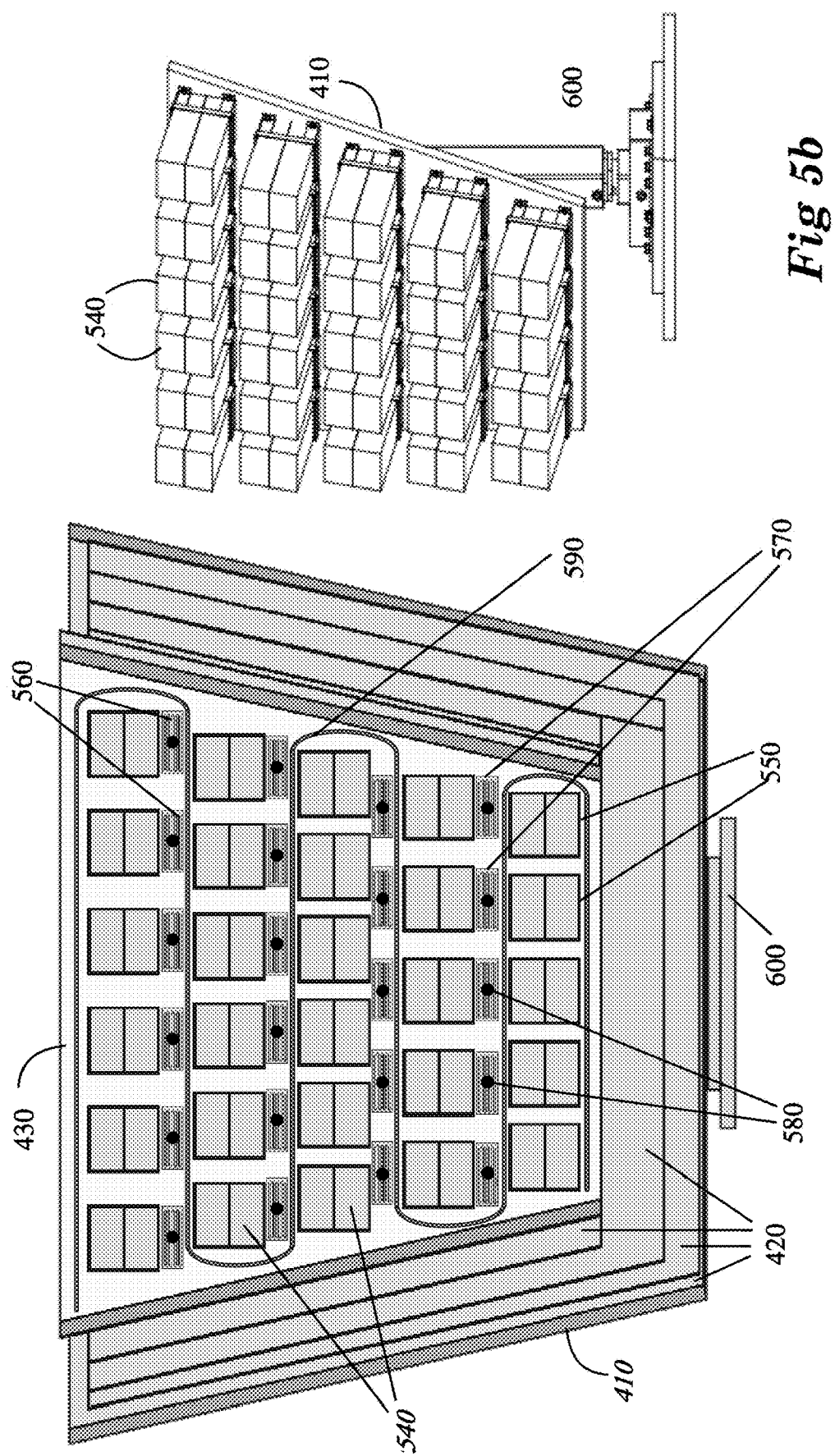

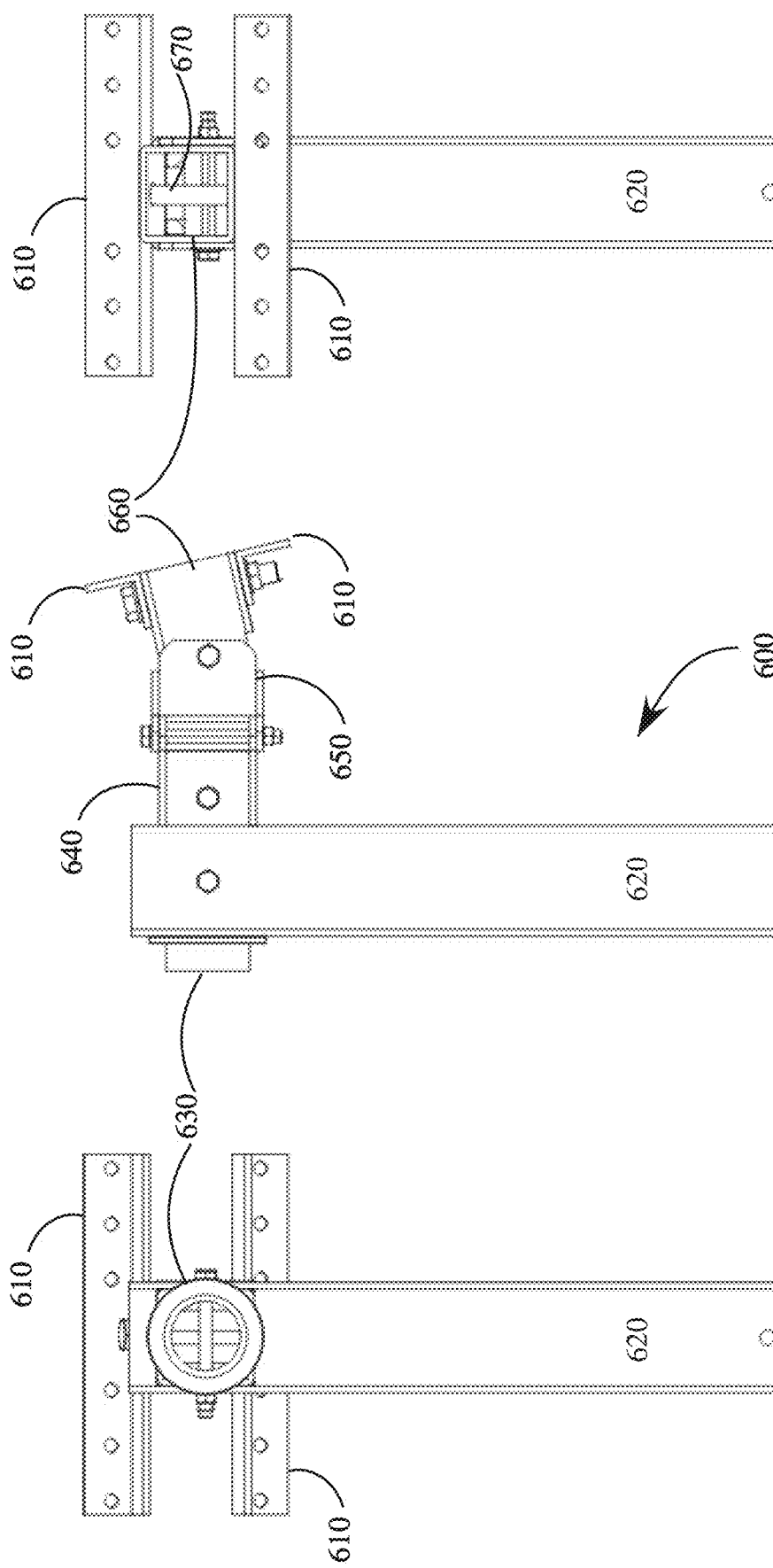

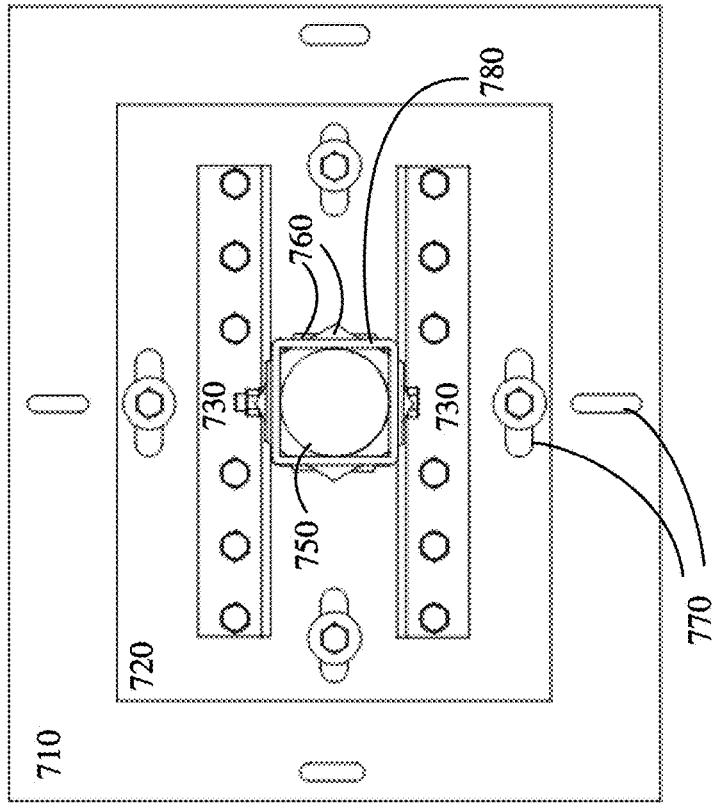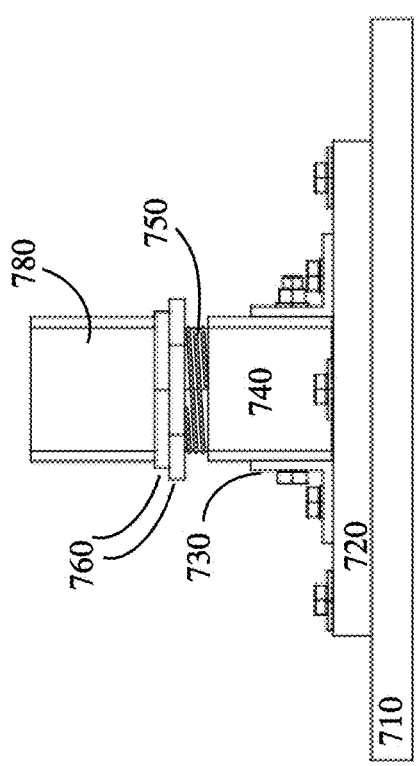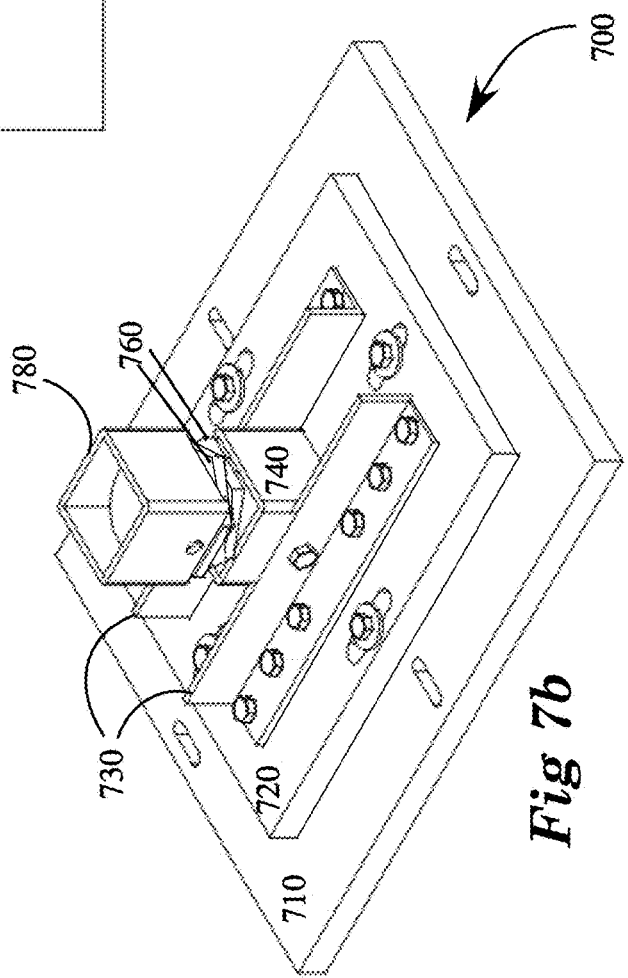

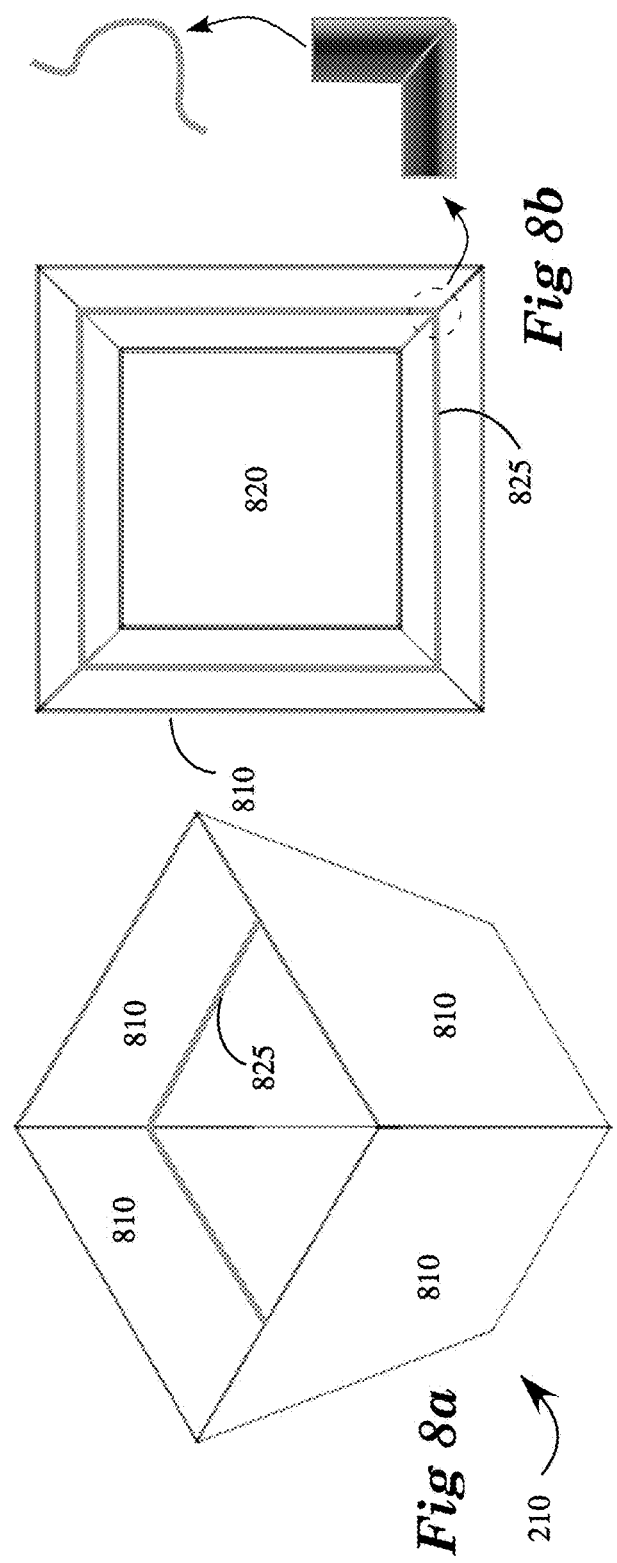
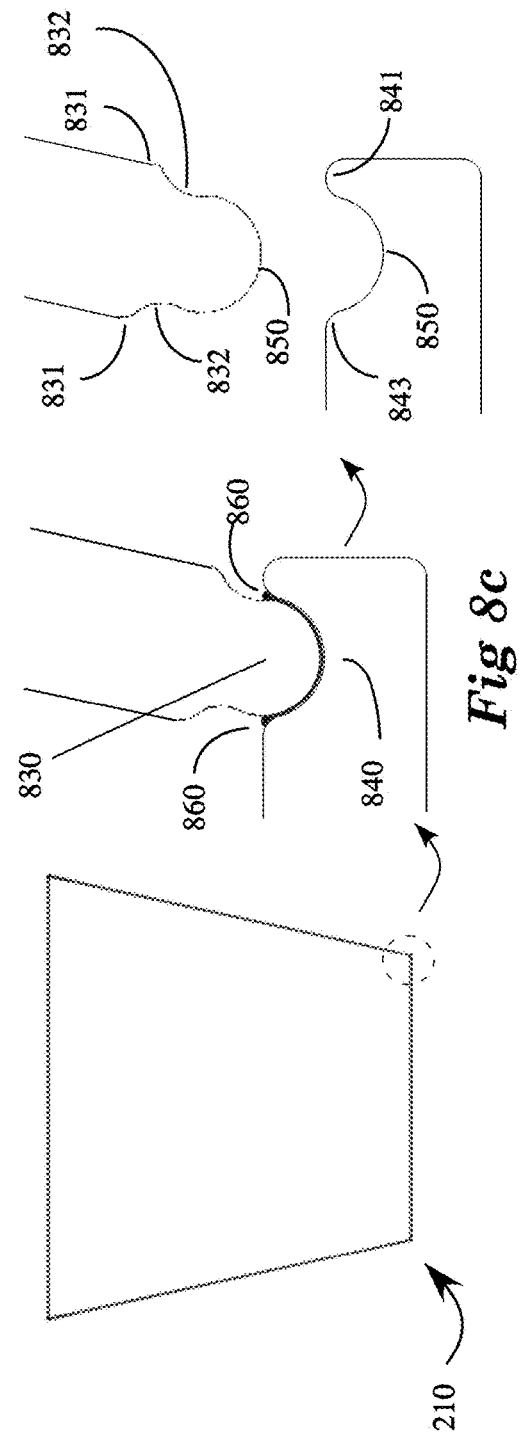

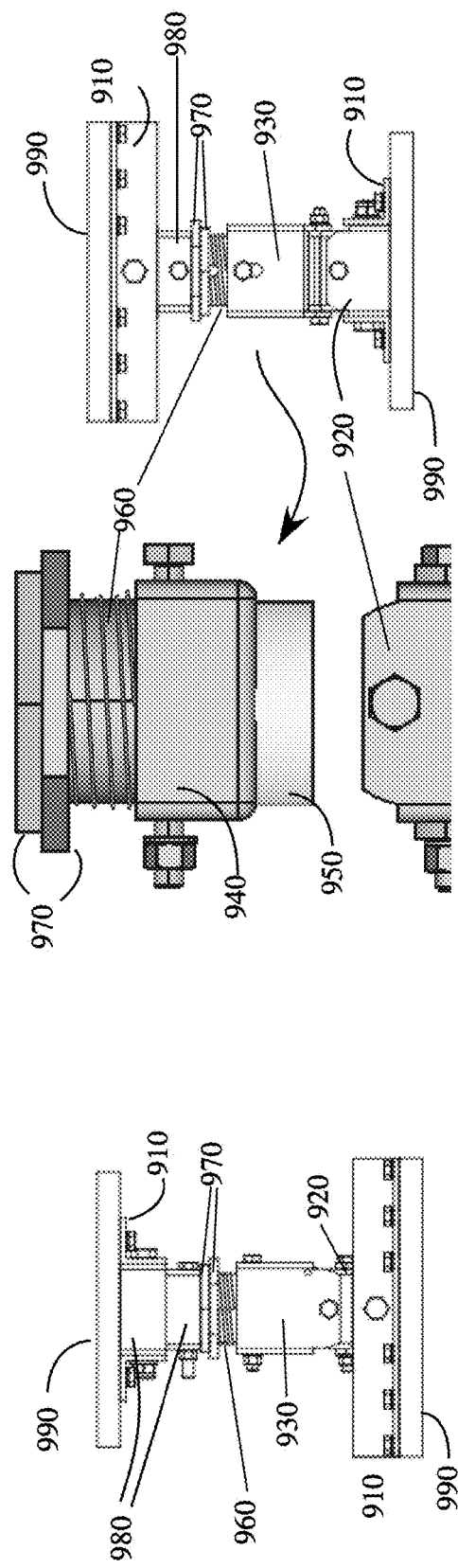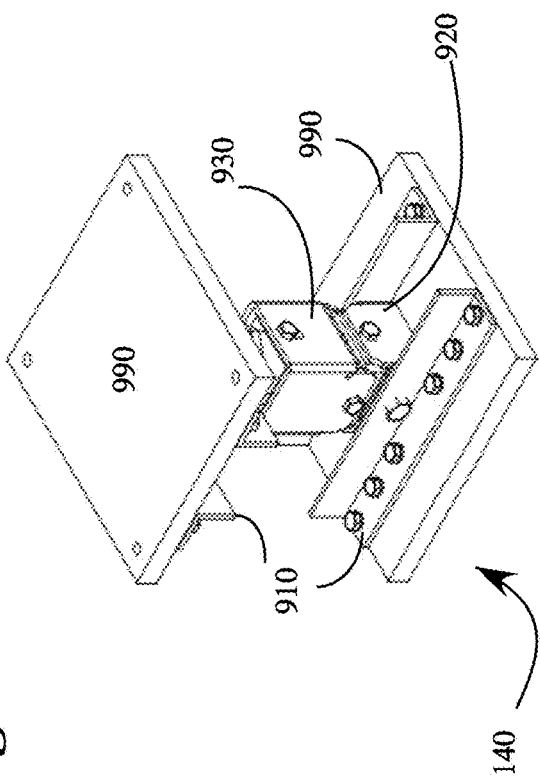
Fig 9a  Fig 9b  Fig 9c

THERMOPHYSICAL FLOAT GLASS PROCESS

BACKGROUND

Near the middle of the twentieth century, a process was developed to make glass nearly perfectly flat by pouring the liquid glass on liquid tin. Liquids at rest near the surface of the earth take on the surface curvature of the earth, as can be recognized by the distance to the horizon on the ocean or large lakes. Because tin is denser than glass, the glass floats on the tin and spreads out to be nearly perfectly flat, with the top of the glass and the bottom of the glass nearly perfectly parallel. For a float line, a glass furnace is typically on the order of ~150 ft long by 30 ft wide and holds around 1200 tons of glass. To achieve chemical homogeneity, the glass is heated to about 1550-1600° C. in the furnace, and brought to about 1100-1200° C. in a forehearth. From there, the glass flows through a channel onto a tin bath that is maintained at a temperature of 600° C.

Because tin remains liquid at temperatures at which glass has become a solid, the glass is allowed to cool on top of the tin as a production process. To speed production, the glass is pulled along the top of the liquid tin as a continuous process by rollers at a continuous speed. As new glass is poured on the beginning of the float line, the amount of which is controlled by a tweel, cooler glass is pulled off the end of the tin pool.

This pulling process creates significant stress on the glass, causing strain deformation within the glass. The glass must go through a significant annealing process in order to relieve the strain which, if not removed, affects the optical clarity of the glass and renders the glass fragile and subject to damage under moderate temperature and mechanical forces.

The tin bath is traditionally constructed as a cementitious refractory tank heated using combustion of petrochemical fuels (or rarely electric heating) with the heat source situated above the tin bath. This renders the process very inefficient. Additionally, since most glass is made using heat generated by combustion of petrochemical fuels, a significant amount of $CO_2$ is emitted.

BRIEF SUMMARY

The present disclosure describes an apparatus and method for producing float glass by floating molten glass on liquid tin. The apparatus and method presented here significantly improve the efficiency of heating the tin and reduce the stress on glass as it is being processed, because a ribbon of glass is not pulled over the tin bath. The reduced stress may minimize or eliminate a process for annealing the glass. The liquid tin is at rest or under centripetal forces that create a surface curvature related to the radius of curvature and the tangential velocity of the pool of tin and the containing tank In an embodiment, a method of forming a sheet of float glass includes providing a predetermined volume of tin to a tub in a tank, the tub comprising a material with a transmissivity of least 30% in a first frequency of the infrared spectrum, activating a first plurality of infrared emitters to transmit infrared energy in the first frequency to heat the tin to a temperature above 600° C., introducing molten glass onto an exposed surface of the heated tin, cooling the molten glass to a solid state, and removing the solid glass sheet from the tub. The method may include placing a top cover over the tub, the top cover comprising a second plurality of infrared emitters, and activating the second plurality of infrared heaters to provide heat to the molten glass.

In an embodiment, the method includes filling an environmental chamber containing the tank with a non-oxidizing gas. The method may further include pressurizing the environmental chamber using the non-oxidizing gas to spread the molten glass over the heated tin. Pressurizing the environmental chamber may thin a puddle of the molten glass, thereby reducing the thickness of a sheet of glass. Cooling the molten glass may include at least one of providing a gas to at least one of a side assembly, a top assembly, and a top cover of the tank, or providing a heat exchange fluid to a fluid channel disposed in at least one of a side assembly, a top assembly, and a top cover of the tank.

Removing the solid sheet of glass may include removing a top cover from the tank, moving a mechanical apparatus including a suction device over the tank, lowering the suction device into contact with the sheet of glass and applying suction, and lifting the sheet of glass out of the tank. The tin may be heated to a temperature of at least 800° C., or at least 900° C. The molten glass may be cooled at a rate sufficient to anneal or temper the glass. In an embodiment, a depth of the tin is no more than six inches when the tin is at a temperature of 650° C.

A groove may be disposed in a side of the tub at a position that corresponds to a location of an edge of the molten glass after the molten glass has spread over the surface of the heated tin. The edges of the molten glass may cool to have a shape of the groove, and a depth of the groove may be less than an amount of shrinkage experienced by the solid glass sheet so that when the solid glass sheet is removed, the solid glass sheet has finished edges. The method may be a batch process. In an embodiment, the method includes melting a predetermined amount of glass to provide the molten glass that is introduced onto the heated tin in a single batch.

In an embodiment, a method of forming a sheet of float glass includes melting a predetermined volume of tin in a tub within a tank, the tub comprising a material with a transmissivity of least 30% in a first frequency of the infrared spectrum, activating a first plurality of infrared emitters to transmit infrared energy in the first frequency to heat the tin to a temperature above 600° C., introducing molten glass onto an exposed surface of the heated tin;

placing a top cover over the tub, the top cover comprising a second plurality of infrared emitters, activating the second plurality of infrared heaters to provide heat to the molten glass, and after the molten glass has spread over the exposed surface of the heated tin, cooling the molten glass to a solid state and removing the solid glass sheet from the tub. The material of the tub may have a passband corresponding to the first frequency. The method may include filling an environmental chamber containing the tank with a non-oxidizing gas, and pressurizing the environmental chamber using the non-oxidizing gas to spread the molten glass over the heated tin. Pressurizing the environmental chamber may cause the molten glass to spread across the surface of the heated tin, thereby reducing a thickness of the molten glass. Cooling the molten glass may include one or both of providing a gas to at least one of a side assembly, a top assembly, and a top cover of the tank, and providing a fluid to at least one of a side assembly, a top assembly, and a top cover of the tank. The molten glass may be cooled at a rate sufficient to temper the glass.

BRIEF DESCRIPTION OF THE DRAWINGS

The accompanying drawings are intended to convey concepts of the present disclosure and are not intended as blueprints for construction, as they are not necessarily drawn to scale: the drawings may be exaggerated to express aspects of unique detail. The figures merely describe example embodiments of the present disclosure, and the scope of the present disclosure should not be construed as limited to the specific embodiments described herein. The foregoing aspects and many of the attendant advantages of embodiments of this disclosure will become more readily appreciated by reference to the following detailed descriptions, when taken in conjunction with the accompanying drawings, wherein:

FIG. 2 shows an elevation view of an embodiment of a tank assembly, with a tank platform, bottom mount and support arms, without a top cover equipment or environmental containment chamber. FIG. 2 also includes an inset with a cross-sectional view to show the interior tub and refractory layers.

FIGS. 3a, 3b and 3c are various views of an embodiment of a tank bottom assembly. FIG. 3a is a top view showing the top layer of refractory and the bricks and infrared emitters mounted in it. FIG. 3b is an elevation view of the tank bottom showing the mount plate and its plurality of refractory layers on which the tub rests. FIG. 3c shows a front perspective view with the refractory layers, gas jets, heat-removing coils and emitters removed to show positioning of insulating bricks. An inset shows detail of an insulating brick pair with sheet metal wrap, conceptually removed from its mounting plate.

FIG. 4a is a front elevation view, showing the attachment of a support arm subassembly to the side of the tank. FIG. 4b is a side elevation view showing a plurality of refractory layers which will be pressed up against the side of the tub resisting the gravitational forces against the tin.

FIGS. 5a and 5b are two more views of an embodiment of a side of the tank. FIG. 5a is a cut-away view showing components of the tank side including insulating bricks and emitters. FIG. 5b shows a side perspective view of the side without refractory layers, infrared emitters, cooling jets and heat-removing coils to show the positioning of the insulating bricks.

FIGS. 6a, 6b and 6c are various views of an embodiment of a side support assembly that supports a side of the tank. FIG. 6a is a back view, FIG. 6b is a side view, and FIG. 6c is a view of the face of the arm which attaches to the mount plate of the tin tank side support assembly.

FIGS. 7a, 7b and 7c are various views of an embodiment of a mount foot of the side support assembly. FIG. 7a is a front elevation view of the mount foot, showing various adjustment components for raising or lowering the side support. FIG. 7b is a top perspective view of the mount foot. FIG. 7c is a top view of the mount foot, showing various attachment components and a pivoting axle.

FIGS. 8a, 8b and 8c are various views of an embodiment of a ceramic glass tub. FIG. 8a is a top perspective view of the tub. FIG. 8b is a top view straight down into the mouth of the tank with insets which show an edge mold cut into the sides of the tub to receive the edge of the liquid glass. FIG. 8c is an elevation view of the tub, with insets showing the interface between two sheets of ceramic glass forming a lower corner of the tub.

FIGS. 9a, 9b and 9c show various views of an embodiment of a load cell foot. FIG. 9a is a front elevation view. FIG. 9b shows a side elevation view, including an inset with a magnified view showing a load cell and load cell attachment. FIG. 9c shows a top perspective view of the platform support foot.

FIG. 11a shows a top perspective view of the tank as the glass is being poured in. FIG. 11b shows the glass spreading out and thinning as it pours. FIG. 11c shows the glass as it reaches its equilibrium thickness.

FIG. 16a is a side elevation view of the apparatus. FIG. 16b is a side perspective view of the apparatus in mid-swing. FIG. 16b includes an inset to show more detail of the tub, the tin bath within it and the layer of glass being curved on top of the tin.

FIG. 16c is a front perspective view of the apparatus.

DETAILED DESCRIPTION

Figure 1:
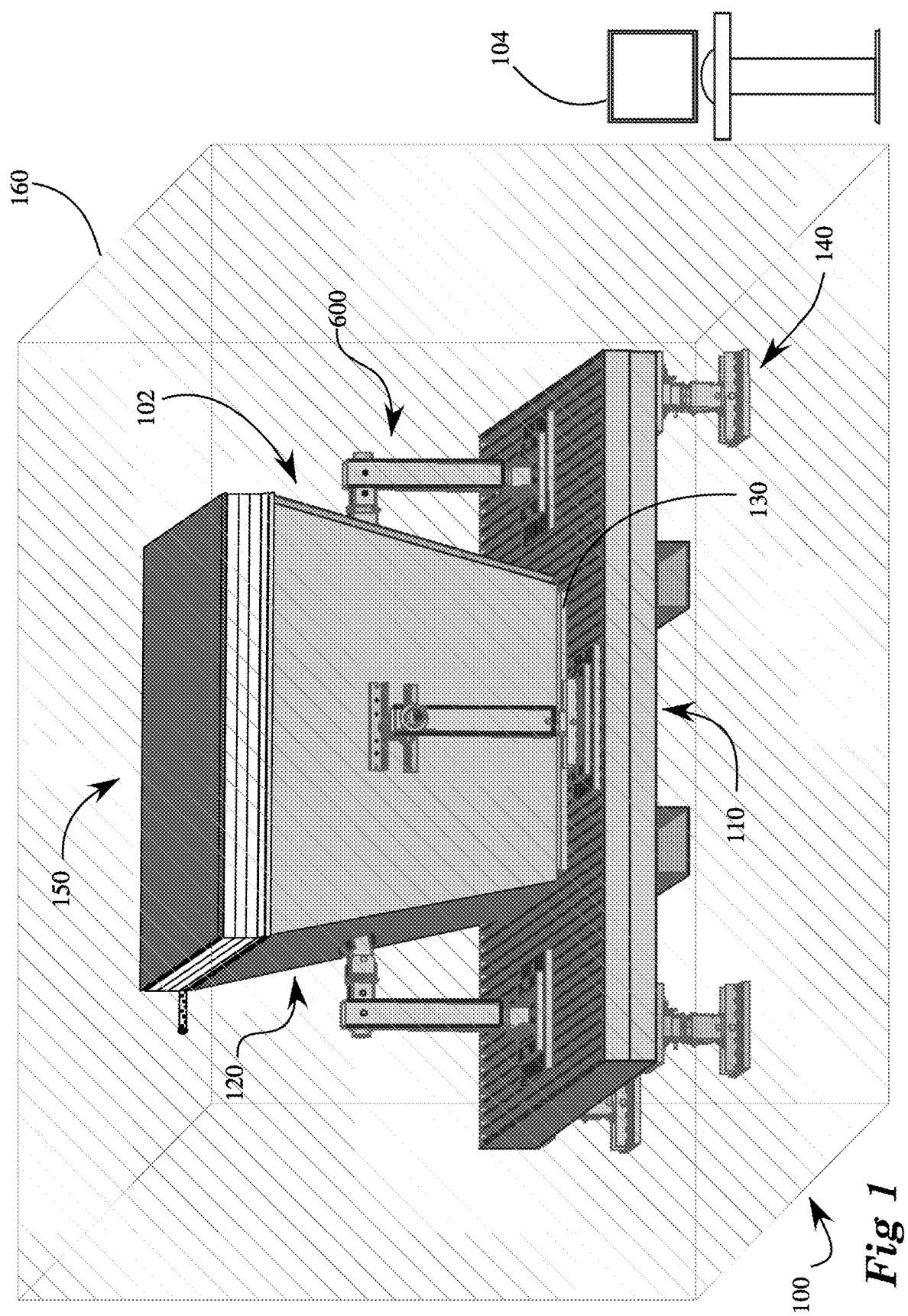
FIG. 1 is a front perspective view of an embodiment of a glass processing system, showing a molten tin-handling tank assembly and cover mounted on a platform, surrounded by support arms positioning insulating bricks, infrared emitters and refractory layers against a ceramic glass tub, all of which is housed within an environmental chamber.

The following list provides specific descriptions and examples of items that are present in the embodiments illustrated by the figures. The descriptions in the list are illustrative of specific embodiments, and should not be construed as limiting the scope of this disclosure.

REFERENCE

Numerals Description
100 Float glass system
102 Tank
104 Controller
110 Tank platform
120 Tank side assembly
130 Tank bottom assembly
140 Tank platform load cell foot
150 Tank roof or top cover assembly
160 Environmental chamber
210 Tub
220 Forklift pocket
310 Bottom plate
315 Shallow placement pocket in bottom plate
320 Bottom refractory layer
321 Cooling gas jet in tank bottom assembly
322 Fluid channel in tank bottom assembly
330 Innermost bottom refractory layer 340 Insulating brick
345 Sheet metal wrap forming hollow pocket to hold insulating brick
346 Sheet metal band or retainer
350 Hole in refractory for brick mounting in bottom assembly
360 Infrared radiant emitter in bottom assembly
370 Hole in refractory for infrared radiant emitter in bottom assembly
410 Side plate
420 Side refractory layer
430 Innermost side refractory layer
540 Insulating brick in tank side assembly
550 Hole in refractory for brick mounting in tank side assembly
560 Infrared radiant emitter in tank side assembly
570 Hole in refractory for emitter mounting in tank side assembly
580 Cooling gas jets in tank side assembly
590 Fluid channel in tank side assembly
600 Side Support assembly
610 Side Support heat brace
620 Side Support post
630 Side Support rotator collar
640 Side Support articulator
650 Side Support mount pivot
660 Side Support heat brace mount
670 Mounting bolt and pivot axle
700 Side support base
710 Support mount providing north-south adaptability
720 Support base providing east-west adaptability
730 Tank leg brace
740 Tank support foot
750 Height adjust shaft
760 Height adjust nut
770 Slotted mounting holes
780 Tank Support Collar
810 Ceramic glass side plate
820 Ceramic glass bottom plate
825 Groove in side of tub walls
830 Protrusion ground into edge, comprising curves which minimize stress on the glass
831 First side radius of curvature of protrusion 830
832 Second side radius of curvature of protrusion 830
840 Groove ground near edge functioning as a receiver for protrusion 830
841 First side radius of curvature of groove 840
843 Second side radius of curvature of groove 840
850 Matching radius of curvature between protrusion 830 and groove 840, the load-bearing and sealing element of the ceramic glass-constructed tank assembly
860 Ceramic adhesive sealant at joins between sheets of ceramic glass
910 Heat brace
920 Connecting support/pivot
930 Load support
940 Load cell housing
950 Load cell
960 Height adjustment shaft
970 Height adjustment nut
980 Ankle attachment/pivot
990 Mounting plate
1010 Tunable high intensity infrared emitter
1020 Optical two-wavelength emissivity compensating temperature sensor
1030 Machined very low thermal conductivity ceramic fiber refractory
1040 Radio frequency proximity sensor configured to measure range to the tin pool
1050 Ceramic glass tank cover plate
1055 Metal lip on bottom of tank cover assembly
1060 Non-oxidizing cooling gas jet in tank cover assembly
1070 Fluid channel in tank cover assembly
1080 Thermocouple temperature sensor
1090 Mounting plate for tank cover
1110 Tin pool surface
1120 Liquid glass being poured into tin tank
1130 Glass spreading out on tin bath
1140 Glass as it reaches equilibrium thickness at the edge of the tub
1210 Viscosity vs temperature curve for soda-lime glass
1220 Conventional tin pool temperature of 600° C. indicating a log viscosity of about 9
1230 Tin pool temperature for receiving glass with a viscosity log of about 4.2
1240 Tin pool temperature for receiving glass with a viscosity log of about 5.8
1310 Identifies the upper and highly transmissive passband for an example second generation non-tinted translucent Ceramic Glass at a selected wavelength
1320 Output curve for infrared heater tuned to peak of about 3250 nm
1325 Peak of output curve at about 3250 nm
1410 Output curve for infrared heater tuned to peak of about 1500 nm
1415 Peak of output curve at about 1500 nm
1420 Output curve for infrared heater tuned to peak of about 3250 nm
1425 Peak of output curve at about 3250 nm
1430 Output curve for infrared heater tuned to peak of about 2250 nm
1435 Peak of output curve at about 2250 nm
1610 Tin tub portion of a centrifugal accelerator apparatus
1620 Tin pool within tub of a centrifugal accelerator apparatus having an induced radius of curvature on surface
1630 Side arm of centrifugal accelerator apparatus
1640 Centrifugal accelerator swing axle
1650 A layer of molten glass disposed on the curved tin pool 1620, taking the curvature of the tin's surface Embodiments of the present application include a system that heats tin by exposure to high-intensity infrared energy from the sides and the bottom of a tank through ceramic glass that is highly transmissive at certain infrared wavelengths. This physical construction enables a high level of control and responsiveness in the management of the temperature of the tin bath. To this end, the tin bath can be heated to temperatures such as 950° C. where the viscosity of the glass is reduced by more than four orders of magnitude over conventional processes where the tin is kept at approximately 600° C. Because tin has a thermal conductivity that is an order of magnitude higher than glass, the tin can be used to control the glass temperature by heating or cooling the tin externally.

The embodiment of a tin bath illustrated by the figures comprises a tub 210 in which at least a bottom surface is ceramic glass, surrounded on each of four sides by tank side support assemblies 120, and supported from below by a bottom assembly 130. These tank side support assemblies and bottom assembly contain insulating bricks 340, 540 mounted on an aluminum plate 310, 410 to support the ceramic glass plates 810, 820 comprising the tub and minimize the load stresses applied to the ceramic glass. The insulating bricks may have a compression strength that is an order of magnitude higher than a ceramic fiber insulating refractory material that fills voids between the working components of the containment system.

The plate 410 of the tank side support assembly is supported by a 6-degree of freedom alignment mechanism (side support arm assembly 600) that supports a precise fit between the ceramic glass tank components. This fit is aided by the sort of ball and socket or rod and trough edge treatment of the ceramic glass in the embodiment shown in FIG. 8C. Additionally, the entire tank assembly of tub 210, tank side support assemblies 120, and bottom assembly 130 is mounted on a tank platform and support 110 which includes platform load cell feet 140 which incorporate a series of load cells 950 enabling the measurement and precise delivery of glass to the float process. This minimizes down-stream processing and product waste recycling where appropriately sized tin baths can produce near-finished products.

This high level of control enables a return to the batch processes of previous generations of plate glass manufacturing but with an improved float glass product. Such a process enables highly efficient short startup and cool down times, as well as precise production on demand.

In a traditional float glass process, the tin bath has a significant volume to assist in stabilizing the temperature of the bath which is heated from above. The goal of the traditional float glass control process is to keep the tin bath at the same temperature all the time. For this reason, float glass production lines run 24×7 for years until the line is replaced by new equipment.

Traditional float glass processes mechanically pull the cooling glass along the tin bath. This pulling introduces significant stresses into the glass. The edges of the glass where the tractor cleats interface with the glass create strain deformation which is routinely cut off and recycled as part of the ongoing production process, thus reducing overall efficiency. The glass is typically at a temperature that is greater than 1,200° C. when it is poured onto the tin bath. The 600° C. temperature of the tin bath also causes significant stress on the glass since the glass surface in contact with the tin, or lower side, cools more quickly than the exposed upper side of the glass.

The strain deformation within the float glass product is relieved by the next step in a conventional production process line, called a lehr oven. Lehrs can be up to and greater than 1,000 feet in length. They are usually gas fired and are used to anneal the glass by elevating the glass up to near 800° C. for an extended period of time, after which the glass is allowed to slowly cool. The product from the lehr process is annealed float glass.

In contrast, an embodiment of the present disclosure operates with a minimal tin bath volume. Molten tin is typically several times the density of molten glass, so it is possible to float a layer of glass on a layer of tin that is thinner than the floated glass. Accordingly, in some embodiments, the layer of molten tin on which the glass is floated may be 1 cm, 2 cm, 3 cm, 5 cm, or 10 cm or greater. While greater thicknesses of tin provide a larger thermal mass that may reduce fluctuations in temperature, lower thicknesses of tin can be heated and cooled more quickly, and require less energy to heat.

In an embodiment, infrared energy can be provided fast enough that the tin can be heated to as much as 950° C. or more to minimize the thermal shock of the glass being poured onto the surface of the tin. Significantly, the stresses introduced are much less than would exist if the tin were at a lower temperature, such as the 600° C. temperature of conventional processes. Additionally, because the stresses introduced by the thermal shock are smaller, they are more quickly relieved from the glass because the viscosity of the glass is more than four orders of magnitude lower at 950° C. than it is at 600° C., and more than 2 orders of magnitude smaller at 800° C. Accordingly, a process of the present disclosure may heat the tin to a temperature that is greater than 600° C. or 950° C. Finally, because the glass is not pulled along the surface of the tin and the temperature of the tin is much higher than the traditional float glass process, an annealing time may be reduced to seconds or minutes instead of hours.

In a process of the present disclosure, the tin may be both heated and cooled to control its temperature, and thereby control the temperature of the bottom surface of glass floating on the molten tin. Simultaneously, the top of the glass may be heated or cooled to maintain a desired temperature. The temperature of the upper surface of the glass may be controlled to be close to the temperature of the tin and the bottom of the float glass—for example, the temperature of the upper surface of the glass may be controlled to be within 10° C., 50° C. or 100° C. of the temperature of the tin. Temperature sensors 1020 and 1080 may be employed to measure the temperature of the upper surface of the glass. In an embodiment, temperature sensor 1080 is configured to measure the temperature of ceramic glass sheet 1050 or refractory layers 1030, and temperature sensor 1020 is configured to measure the temperature of material in the tank.

The temperature of the tin may be monitored simultaneously with the temperature of the ceramic glass containing the tin bath. The apparatus heating the tin using the incorporated tunable infrared emitter 360, 560 which can pass infrared thermal energy through the ceramic glass 810, 820 also employs non-oxidizing gas jets 321, 580 and conduction fluid heat exchangers 322, 590 on the surface of the ceramic glass to cool the tin 1110 by cooling the ceramic glass. The ceramic glass is in contact with the tin which is cooled by conduction. Accordingly, an embodiment of a float glass system 100 may control an amount of energy provided to infrared emitters 360, 560, a frequency of infrared energy emitted by emitters, a supply and temperature of gas provided by gas jets 321, 580, and an amount and temperature of fluid flowing through fluid heat exchangers 322, 590 to precisely control the temperature of molten tin and a temperature of a bottom surface of glass floating on the layer of molten tin.

The top of the product glass undergoing the annealing/cooling process may be temperature controlled using a similar mechanism. The tank cover 150 may also incorporate tunable infrared emitters 1010, non-oxidizing gas cooling jets 1060 and a conduction fluid heat exchanger 1070. The position of the tank cover 150 may be determined using radio frequency proximity sensors 1040 to enable the positioning of the top ceramic glass 1050 at a precision that is within as little as fractions of a millimeter to provide effective non-contact heating and cooling of the surface of the glass being formed. The volume between the upper surface of floating glass and the lower surface of the tank cover 150 may be controlled so to minimize space between the tank cover and the glass, which increases the efficiency of the system, while providing sufficient volume to circulate gas to control the temperature of the upper surface of the glass. Therefore, the space between the molten glass in the tank and elements of the tank cover disposed over the glass may be less than 1 cm, less than 2 cm, less than 5 cm, or less than 10 cm, for example. In an embodiment, no ceramic glass layer is present in the tank cover 150, and cooling jets can blow directly onto a surface of the glass layer. In another embodiment, holes are present in a ceramic glass layer so that the cooling jets can blow a cooling gas directly onto the float glass.

In an embodiment, the entire forming apparatus is enclosed in an environmental chamber 160 to enable the management of a pressurized, non-oxidizing atmosphere which keeps the tin from oxidizing and the glass surfaces clean. The gas used for the atmosphere may be, for example, a forming gas, a reducing gas in general with some amount of hydrogen, or an inert gas such as argon or nitrogen, or a blend of inert gasses. The system may include a controller that is configured to control the pressurized bath from a low of less than 1 Torr to a maximum of more than 5,000 Torr. The ability to control the pressure on the tin bath enables the manipulation of the equalization of the forces acting on the glass to arrive at an "equalization thickness" and thus, along with the control of the size of the tin bath, the temperature of the tin bath and the temperature of the glass, the thickness of a sheet of glass produced by the forming apparatus can be controlled to be from a millimeter to tens of centimeters. See, e.g., processes S1510, S1515, S1520 in FIG. 15, where the type of glass being created is input to the system so that the process can be configured to produce and treat the glass according to the input parameters.

When the glass under process is cooled to a temperature of approximately 250° C., per the cooling profile accessed in S1561, it is a nearly finished glass product. The product glass can be lifted from the tin bath 1110 using silicon suction cup devices to lift the glass from the surface of the tin. This product can be scored and cut to a finished size and provided as an annealed glass.

Figure 15:
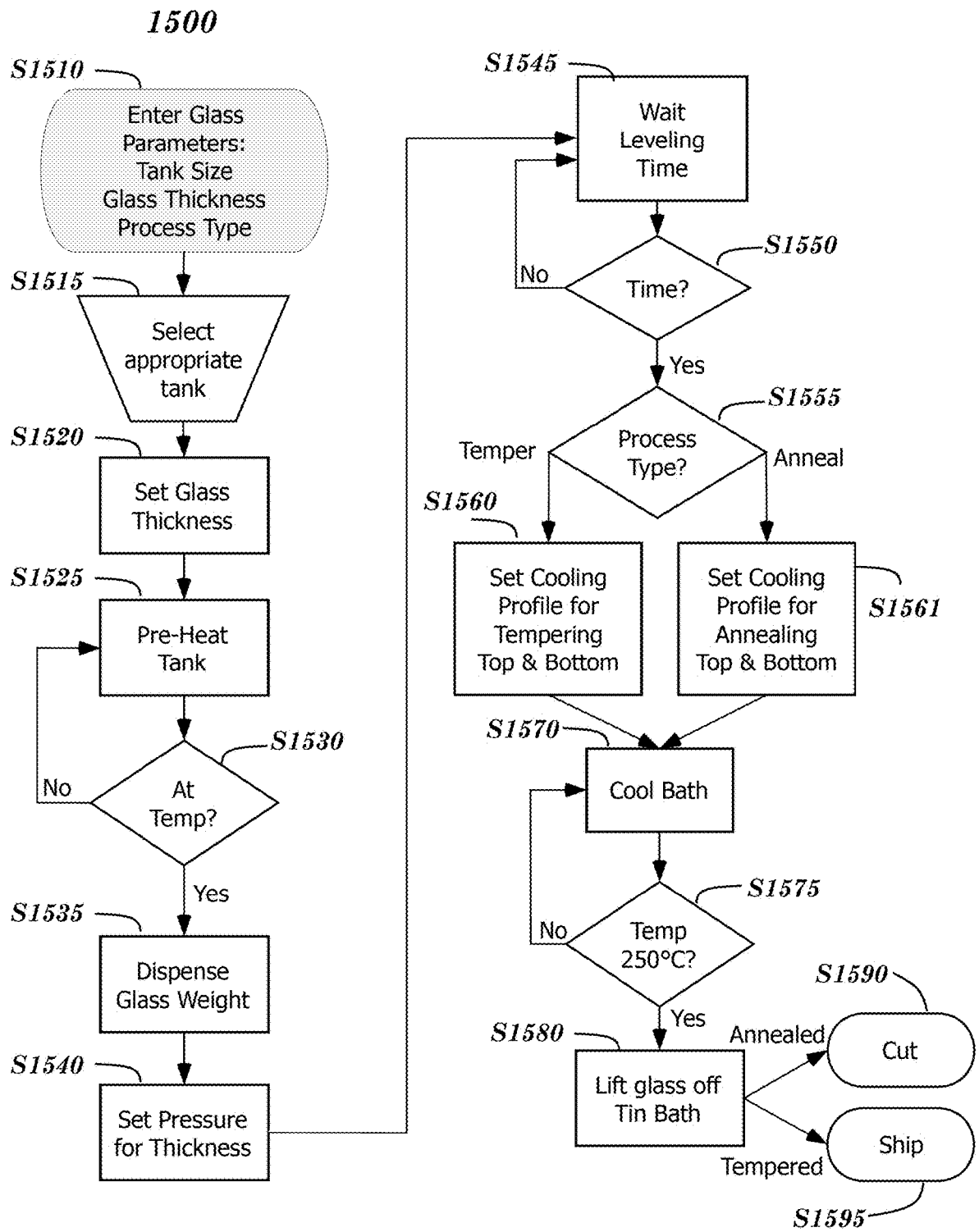
FIG. 15 is a flow chart showing an embodiment of a process of producing float glass.

Alternatively, as indicated in FIG. 15 at S1560, the glass can be placed into a new tempering process using ceramic glass conduction heating and cooling mechanisms to both heat and cool the glass as disclosed in patent application Ser. No. 17/407,098.

Individually and in combination, the technologies revealed in this disclosure may reduce the process times to make a finished float glass or a finished tempered glass product from hours to minutes and reduce the energy requirement for either process by orders of magnitude.

Embodiments of the present disclosure will now be described with respect to the features illustrated by the figures. Referring to FIGS. 1 and 2, an embodiment of a float glass system 100 includes a tank 102 that is configured to retain and heat molten tin and glass in a float glass process. The tank 102 includes four side support assemblies 120 and a tank cover 150 that encloses the tank. The tank 102 is supported by a platform 110 that supports the weight of the tank. As seen in FIG. 2, the platform 110 may include forklift pockets 220 for ease of portability. The platform may have tracks, guides, or similar structures other than forklift pockets 220 that can facilitate transportation of the tank 102. In another embodiment, the tank 102 may be stationary and permanently mounted to a floor or base.

FIG. 2 shows a set of load cell feet 140 disposed under the lower surface of the platform 110. The load cell feet 140 are mechanical assemblies that incorporate load cells 950, which measure the mass of materials that are placed in the tank 102. In particular, the load cells 950 may be used to measure an amount of tin and an amount of glass that is introduced into the tank 102 in a float glass manufacturing process. In an embodiment, values from the load cells are provided to a controller 104 to accurately control the amount of glass that is introduced into the tank 102, and to confirm that the tank contains a desired amount of tin, glass, or both.

The tank 102 further comprises a bottom assembly 130. Together, the bottom assembly 130 and side support assemblies 120 support bottom and side surfaces of a tub 210 that is in turn configured to support molten tin and molten glass that is poured onto the molten tin. Accordingly, the tub 210 is a vessel for creating float glass. Although the tub 210 illustrated by the present figures uses separate pieces of material for the sides and bottom of the tub, in another embodiment, the tub may be formed of a single piece of material. For example, the tub 210 may comprise a single piece of ceramic material that is cast, sintered, or machined to have a net shape of a tub.

FIGS. 3*a*, 3*b* and 3*c* illustrate an embodiment of a bottom assembly 130. The assembly includes a bottom plate 310 which is an exterior surface of the tank 102, and may be a metal material such as aluminum or steel. As seen in FIGS. 3*a* and 3*c*, a plurality of insulating bricks 340 may be mounted directly to the plate 310, and infrared emitters 360 are disposed in spaces between the bricks 340. One or more layer of refractory material 320 is stacked on the bottom plate 310, and the refractory layers 320, 330 are perforated with holes 350 that have the same shape as the bricks 340. In this way, the bricks 340 maintain the refractory layers 320 in a desired orientation while a majority of the volume between the bottom of the tub 210 and the bottom plate 310 is occupied by refractory material.

In an embodiment, a sheet metal wrap structure 345 is formed and placed over a set of refractory insulating bricks 340 already situated within a shallow placement pocket 315 in the bottom plate 310. The sheet metal wrap structure 345 is mechanically secured to the plate 310 and a metal band or similar retaining mechanism 346 is placed around the wrap structure and the two pieces of insulating bricks. In this way, a plurality of insulating bricks 340 can be mechanically coupled to bottom plate 310 in a fixed orientation. Although the bricks 340 are illustrated as having square cross-sectional shapes, other shapes are possible, such as rectangular or circular. In other embodiments, the bricks 340 may be fixed to the plate 310 in a different way from the mechanical assembly described above. In addition, in some embodiments, the bricks 340 comprise a single piece of refractory material or more than two pieces of refractory material.

As illustrated in FIG. 3*b*, a set of refractory layers 320 are stacked on the bottom plate 310. In an embodiment, the refractory layers may be ceramic refractory board materials of standard thickness, e.g. ½, 1, or 2 inches thick. Edges of the refractory layers 320 may be beveled at an angle that matches the angle at which sides of the tank 102 are oriented so that refractory layers 320 of the base fit snugly against front faces of refractory layers 420 of side support assemblies 120. The interfaces may be sealed with a ceramic paste material in a final assembly.

One or more of refractory layer 320, 330 may include a fluid channel 322 that transports a heat-exchange fluid. The fluid channel 322 may include temperature resistant tubing and be thermally coupled to a ceramic glass layer that forms the bottom surface 820 of the tub 210. In an embodiment, the refractory layer 330 that contacts the bottom of tub 210 is a 1-inch-thick layer of material, and the fluid channel 322 is disposed in that layer. In a different embodiment the fluid channel 322 is spaced apart from the bottom surface 820 of tub 210 to reduce the temperature to which the fluid channel is exposed.

A plurality of infrared emitters 360 are disposed in pockets 370 in one of the refractory layers. The emitters may be placed as close as is practical to the bottom surface 820 of the tub 210, and depending on the height of the emitters 360, the emitters may penetrate one, two or more of the refractory layers 320 and 330. Wiring for the infrared emitters 360 may be disposed in holes that are provided in the refractory layers 320. In another embodiment, wiring for the emitters 360 is routed through the bricks 340.

In an embodiment, one or more cooling jet 321 is disposed in the bottom support assembly 130. The cooling jet 321 may be configured to provide a jet of cooling gas to the bottom support assembly 130. In an embodiment, the cooling jets 321 have both a supply and a return orifice to supply cool gas and receive hot gas, thereby displacing heat from the bottom support assembly 130. Although FIG. 3a shows the cooling jets 321 as located in the same general area as the emitters 360, embodiments are not restricted to that location. In addition, vent channels may be provided in one or more of the refractory layers 320 to provide a return path to receive heated gas displaced by cooler gas from the cooling jets 321.

Although FIG. 2 shows tub 210 as being relatively deep compared to its width, the relative depth of embodiments may be much shallower. Energy efficiency of the system can be increased by minimizing the amount of space between the upper surface of a layer of floating molten glass and the lowest surface of the tank cover 150, and by minimizing the amount of tin in the tub 210. Accordingly, the tub 210 may have a depth of from one inch to several inches, or several tens of centimeters, for example. The width of the tub 210 may be sized to create a desired size of glass sheet, which may be several feet in both dimensions. Edges of a sheet of float glass may be scored and removed after being formed, so the tub 210 may have a width and length that are larger than the size of a final glass product. In some examples, the width and length are from one foot to ten or twenty feet or more.

Figure 4A:
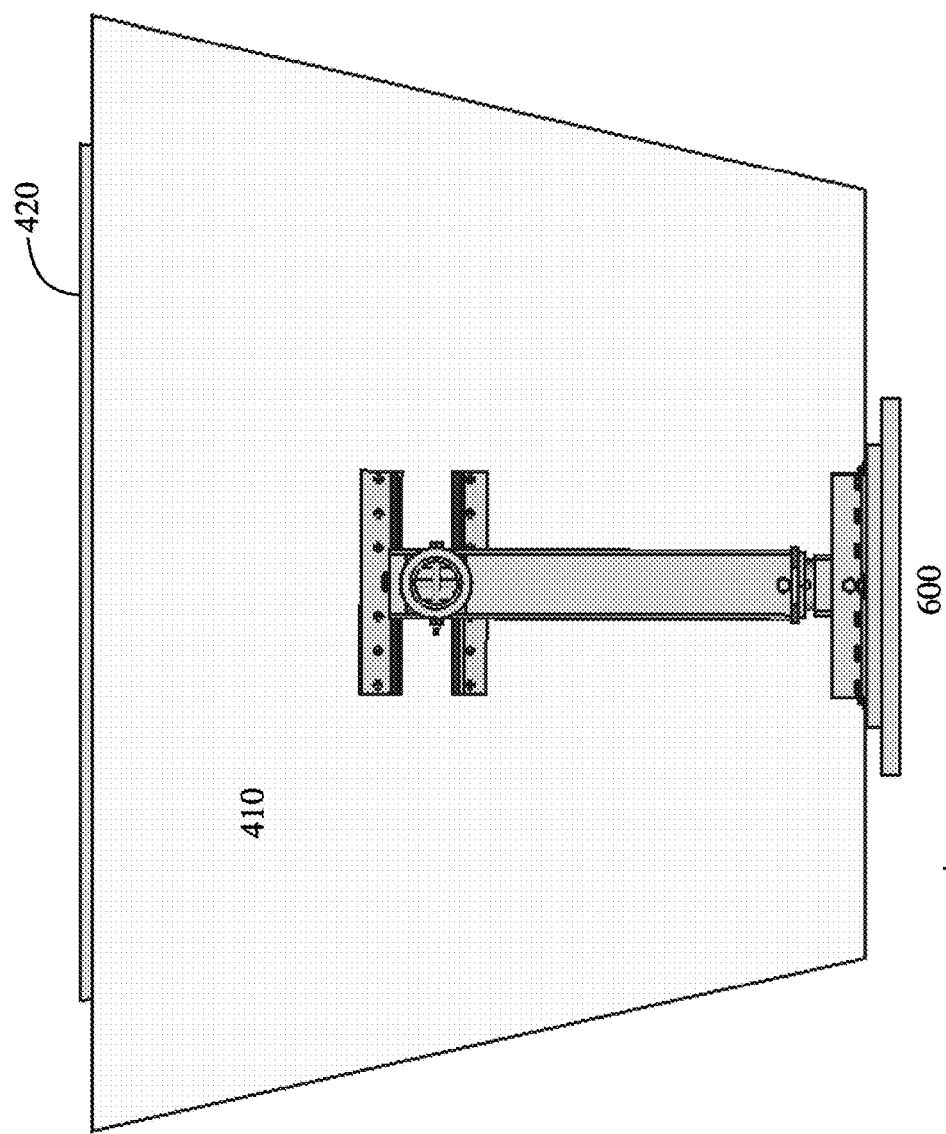
FIGS. 4a and 4b show various views of an embodiment of a tank side assembly.
Figure 4B:
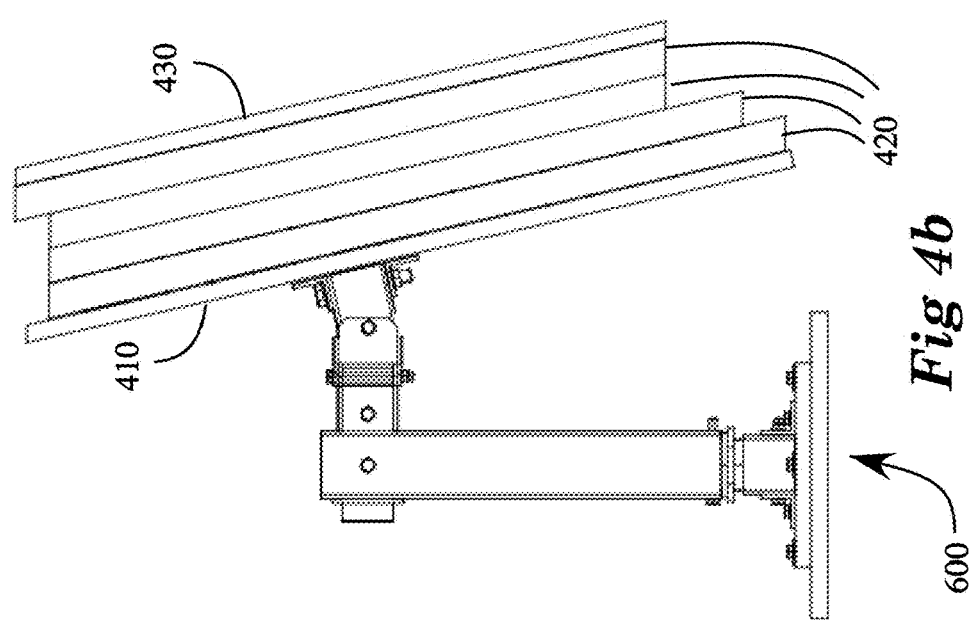

FIGS. 4a and 4b illustrate an embodiment of a tank side support assembly 120. Interior components of the side support assembly 120 are similar to the components of the bottom assembly 130 discussed above—for example, the side support assembly includes a side plate 410 that may be a metal material as an outer surface, a plurality of refractory layers 420 disposed over the side plate, and an innermost refractory layer 430 that is thinner than the other refractory layers 420. However, this arrangement is simply one exemplary embodiment, and other materials and thicknesses are possible.

Lower edges of the refractory layers 420 are disposed at different elevations, and are configured to interface with corresponding edges of refractory layers 320 of the bottom assembly 130. Similarly, side edges of at least some of the refractory layers 420 are inset from one another as they move inward, so that the total width of the innermost refractory layers is less than the width of the outermost layers. The location of upper edges of the refractory layers 420, 430 may be staggered to allow refractory layers 1030 and metal lip 1055 of tank cover 150 to seat into a recessed area of the refractory layers for secure fitment and to shield the metal lip from direct exposure to the infrared emitters.

The side assembly 120 includes a side support assembly 600 that holds a side of the tank 102 in place. In an embodiment, each side of a tank 102 is held in position by a side support assembly 600 that can be adjusted with multiple degrees of freedom to provide precise alignment for each side of the tank with respect to the bottom and other sides.

FIGS. 5a and 5b are front and perspective views of a tank side assembly 120. The embodiments shown in these views include a plurality of refractory brick structures 540, which may be the same or similar to the bricks 340 discussed above. The bricks 540 may be coupled to side plate 410 by an interface with a metal component that is welded or threaded into the side plate. In addition, the side assembly 120 may include a fluid channel 590, radiant emitters 560, and gas jets 580. The refractory layers may have holes 570 which accommodate and expose radiant emitters 560, and holes 550 that accommodate bricks 540.

In other embodiments, the arrangement, size and density of these structures may be different from the configuration shown in FIG. 5a. For example, in some embodiments, none of the components including emitters, fluid channels, bricks and gas jets are present. In such an embodiment, the refractory layers may extend uninterrupted across the width of the tank walls.

In another embodiment, one or more brick or similar structure is present to retain refractory layers, but no radiant emitters, gas jets or fluid channels are present. In some embodiments, the upper and lower radiant emitters 360 and 1010 are in close proximity to the molten materials in the tank—for example, radiant emitters may be within 6, 12, 18 or 24 inches of a lower surface of the molten tin or an upper surface of molten glass.

In some embodiments the depth of the tin and glass is only a few inches or less, so only one or two rows of emitters 560 are present in a side of the tank. In another embodiment, no emitters are present, but fluid channels 590 and/or gas jets 580 are present in the sides of the tank to assist with cooling materials in the tank. Other variations are possible.

FIGS. 6a, 6b and 6c show three different views of a side support assembly 600. The side support assembly 600 in these figures can be adjusted with six degrees of freedom, but other embodiments may use a side support with more or less capability for adjustment than the embodiment shown here.

In the embodiment shown in FIGS. 6a-6c, the side support assembly 600 includes a side support post 620 with adjustable vertical travel, and braces 610 that couple the side support assembly 600 to sides of the tank. A rotator collar 630 may adjust horizontal position of the braces 610, and horizontal and vertical angles may be changed by adjusting the pivot 650, articulator 640 and heat brace mount 660. For example, pivot axle 670 may serve as a pivot axis for adjusting the vertical angle. In combination, the structures of support assembly 600 provide a mechanism for aligning sides of a tank 120 to interface with one another and with tank bottom assembly 130 with a high degree of precision to stably support a ceramic glass tub 210 in a float glass process.

FIGS. 7a, 7b and 7c are views of a base 700 of the side support assembly 600. The base includes two plates 710 and 720 with slots 770 that can be adjusted in respective horizontal axes, a brace 730 that supports a foot 740, and a height adjusting nut 760 between the foot 740 and collar 780 that can adjust vertical travel. The collar 780 may be coupled to support arm 620. Accordingly, the base 700 can be adjusted in several different ways to change the location of side support 600 with respect to X, Y and Z axis travel and rotate the side support.

FIGS. 8a, 8b and 8c illustrate several views of a tub 210 that is configured to retain a bath of molten tin and a layer of molten glass floating on the molten tin. The tub illustrated in these figures has trapezoidal sides 810 and a square bottom 820. In the embodiment shown in these figures, the tub 210 is constructed of five separate plates whose edges are fitted together and supported by tank side assembly 120 and side support arms 600.

FIG. 8c shows a detail of an embodiment of one possible mechanical interface between a bottom plate 820 and side plate 810. In the example shown in FIG. 8c, bottom sheet 820 has a semi-circular groove 840 that with a radius 850 transitions to first and second radii 841 and 843. The groove 840 has a radius 850 that is the same as the radius of protrusion 830, so that the protrusion has a positive fit with groove 840. The protrusion 830 of the side plate 810 transitions to a first inset radius 832, which in turn transitions to the nominal thickness of the plate by radius 831.

Accordingly, in the embodiment shown in FIG. 8c, no sharp corners are present in an interface, reducing the chance that the edges would break under thermal and physical forces. In addition, the interface of radius 850 provides a snug fit with a relatively large surface area that can be maintained even if the side plate 830 rotates, which could accommodate displacement at temperature due to thermal expansion. The interface between groove 840 in the bottom plate 820 and the protrusion 830 on side plate 810 may be enhanced by a sealing material 860 such as a ceramic adhesive material, e.g. an alumina paste or putty to seal the joint.

The tub 210 may further include a groove 825 in the side plates 810. The groove 825 may be disposed at a height corresponding to an elevation of a floating glass layer, so that edges of the float glass terminate at the groove 825. The groove 825 may be a curved groove so that edges of the glass are curved, which could reduce or eliminate the need for finishing edges of a sheet of float glass, and reduce the amount of stress that is captured at the edges of the sheet of glass. The reduction in stress at the edges of a sheet of glass may be especially helpful when the cooling process is controlled to temper a sheet of product glass.

The second arrow in FIG. 8b points to a profile of the shape of an embodiment of a groove 825. Float glass may have a higher coefficient of thermal expansion (CTE) than other materials of the tank, so edges of the glass may withdraw from contact with the side plates 810 as the glass cools. Accordingly, it is possible to provide an undercut in the groove 825 that would not prevent a sheet of float glass from releasing from the tub 210. The shape of groove 825 can have a curved shape that is different from the shape shown in FIG. 8b.

FIGS. 9a, 9b and 9c illustrate several views of an embodiment of a foot 140 that is disposed under the tank platform 110. As seen in FIG. 1, an embodiment of a float glass system 100 may include four feet 140 that are disposed under corners of a platform 110 on which a tank 102 sits. The number of feet 140 may vary depending on the size and mass of the tank 102. Each of the feet 140 may be height adjustable, and include a load cell 950. The load cell 950 can be used to determine the mass of materials placed in a tank 102, including an amount of tin and an amount of glass that are placed in the tank. Accordingly, an embodiment may provide a degree of precision and accuracy to float glass manufacturing that is not available in conventional manufacturing processes.

In the embodiment of FIGS. 9a-9c, the feet 140 include a mounting plate 990 as a base, heat bracing 910 that braces a vertical support part of the feet, and a connecting support member 920 that may include a pivot axis about which load support 930 can pivot. The open face of load cell element 950 may interface with a corresponding surface of load support 930, support member 920, or directly on the base plate 990. Load cell 950 may be mounted to load cell housing 940, which is coupled to height adjustment shaft 960 and nut 970. The location of nut 970 may be adjusted against an ankle member 980 to adjust the height of the foot.

However, these specific components are only one example of a foot 140, and other embodiments are possible. For example, in another embodiment, a foot 140 may only be adjustable in the vertical dimension, and may or may not incorporate a load cell 950. In another embodiment, load cells 950 may be located between a tank platform 110 and an upper surface of a foot 140, or not present at all.

Figure 10:
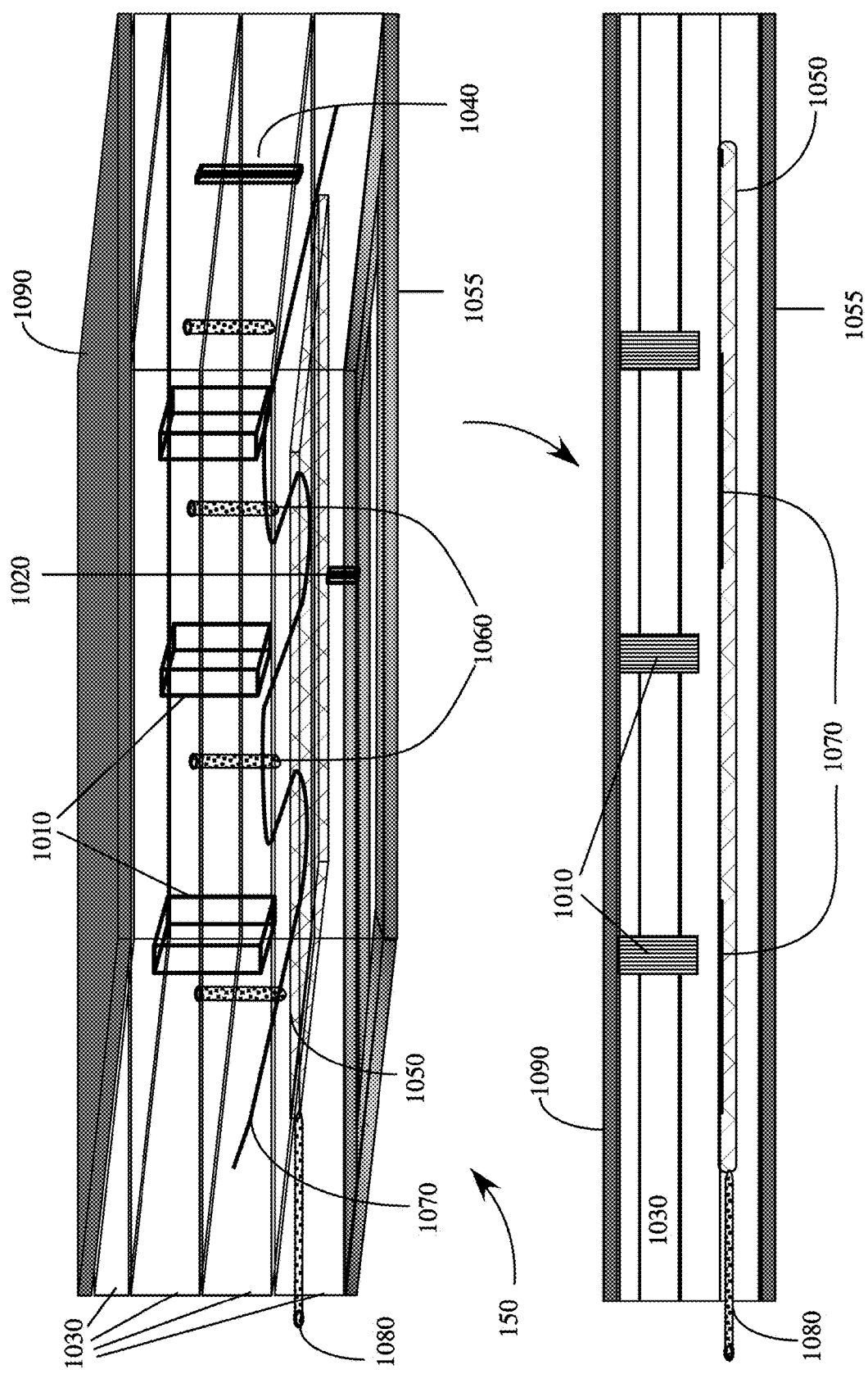
FIG. 10 is a front perspective view of an embodiment of a top cover showing a general orientation of some components. The inset shows a cross-sectional elevation view indicating the relationship of refractory layers, ceramic glass plate, emitters and temperature sensor in the embodiment.

FIG. 10 illustrates an embodiment of a top cover 150 of a tank 102. The top cover 150 includes several refractory layers 1030 that are disposed over a cover plate 1090, which may be a metal material such as aluminum or steel. The top cover 150 may include a plurality of emitters 1010, one or more temperature sensor 1020, one or more proximity sensor 1040 and one or more fluid channel 1070. In an embodiment, the glass-facing surface of the top cover 150 is a layer of ceramic glass 1050. However, in another embodiment, no ceramic glass sheet 1050 is present. The top cover 150 may be removed to introduce glass into the tank, and to extract product glass from the tank.

One or more thermocouple 1080 may be present in the top cover 150 and configured to measure a temperature of a ceramic glass sheet 1050 (if present), air temperature, fluid temperature, temperature of a refractory material, etc. A separate temperature sensor 1020 may be configured to measure the temperature of gas within the tank 102 when the top cover 150 covers the tank, or a temperature of radiant emissions from the emitters 1010. In an embodiment, the temperature sensor 1020 is an optical two-wavelength emissivity compensating temperature sensor, but embodiments are not limited to that specific type of sensor.

Components in the cover 150 including the emitters and gas jets 1060 may be directly or indirectly coupled to the cover plate 1090, so that the cover plate provides physical support for the components. In an embodiment, the refractory layers 1030 are suspended from the cover plate as described, for example, in U.S. application Ser. No. 17/347,428, the contents of which are incorporated herein by reference. In addition to or as an alternative to a suspension system, the refractory layers 1030 may be mechanically retained by mechanical elements disposed on sides of the cover 150. In one embodiment, a ceramic glass layer 1050 is retained by a mechanical coupling to the cover 1090, so that the ceramic glass layer 1050 retains the refractory layers 1030 in position and a metal lip 1055 enhances the fit of the cover to the refractory layers 420, 430 of the tank side assembly 120. In another embodiment, no ceramic glass layer 1050 is present, and the refractory layers are suspended from plate 1090.

Figure 11:
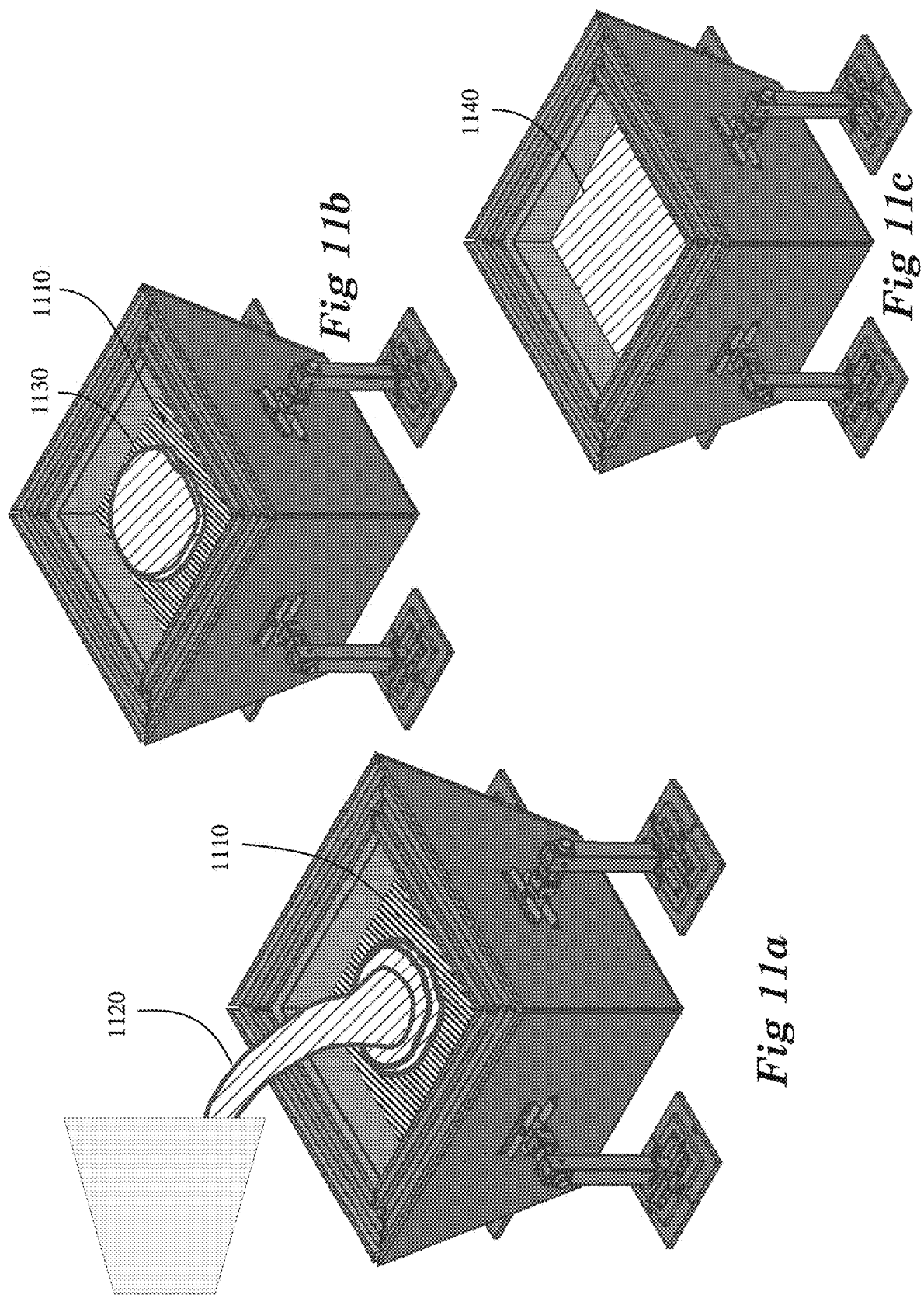
FIGS. 11a, 11b and 11c show an embodiment of a process of pouring liquid glass into a tank.

FIGS. 11a, 11b and 11c show several stages of a float glass process. FIG. 11a shows molten glass 1120 being poured onto a pool of molten tin 1110, FIG. 11b shows a puddle of molten glass 1130 floating on the molten tin, and FIG. 11c shows a layer of glass 1140 that has spread to reach an even thickness across the surface of the tin. In an embodiment, the spreading between FIG. 11b and FIG. 11c may be enhanced by applying an elevated pressure to the glass.

Figure 12:
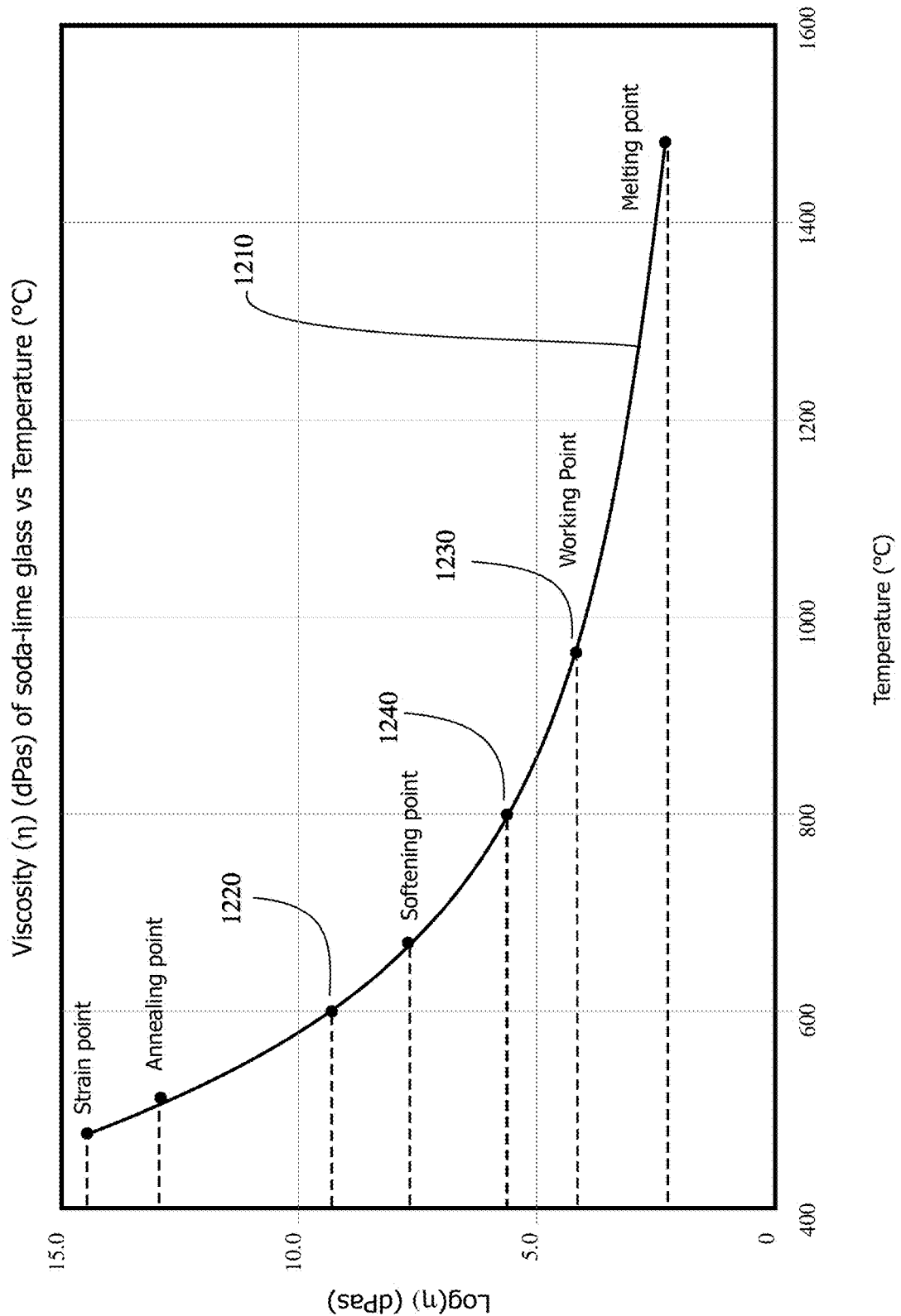
FIG. 12 shows a graph of viscosity of amorphous silicates and significant physiological points in glass manufacturing. Of note is the viscosity difference of the glass between 600° C. and 950° C.

FIG. 12 illustrates a viscosity and temperature curve 1210 of soda-lime glass, including several transition points. For example, point 1220 is at the temperature at which conventional tin baths are maintained, which is 600° C., and indicates a log viscosity of about 9 at that temperature. An embodiment of the present disclosure may operate at different temperatures for different phases of a process, at a temperature of 800° C. at point 1240, having a log viscosity of about 5.8, or a higher temperature of 950° C., which has a log viscosity of about 4.2, as indicated by point 1230. Since the viscosity of glass decreases rapidly with temperatures above 600° C., float glass will level substantially faster when temperatures are elevated even as low as 50° C. or 100° C. above the conventional temperature of 600° C.

Figure 13:
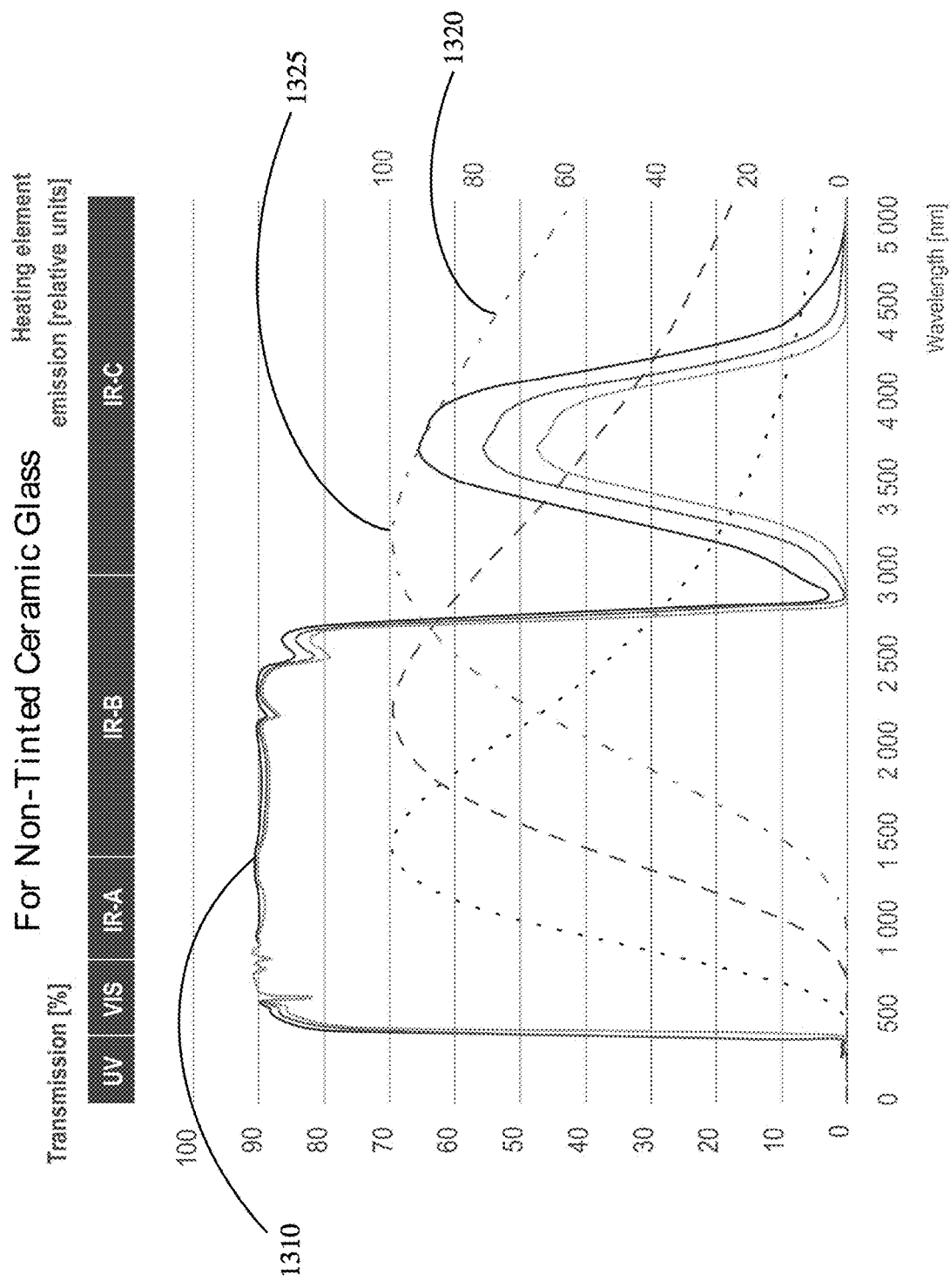
FIG. 13 is a transmission vs. wavelength plot for non-tinted second-generation ceramic glasses plotted along with various tuning plots for an infrared emitter.
Figure 14:
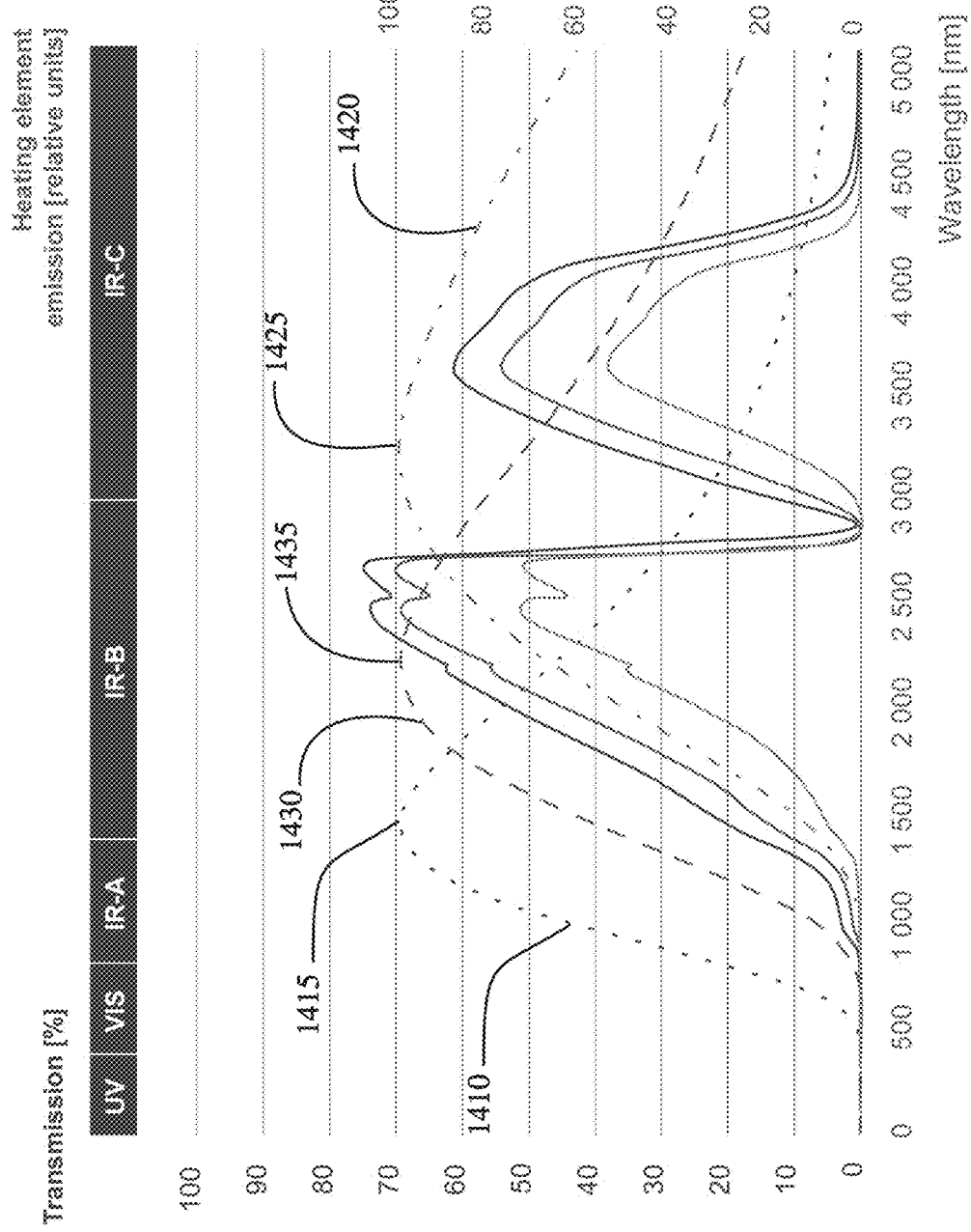
FIG. 14 is a transmission vs. wavelength plot for opaque second-generation ceramic glasses plotted along with various tuning plots for an infrared emitter.

FIGS. 13 and 14 show embodiments of two types of ceramic glass that could be used for a tub 210. The ceramic glass in FIG. 13 has two passbands—the lower passband 1310 is a large passband that spans visible frequencies, and an upper passband is centered between 3500 and 4000 nm wavelengths. Also shown in that figure are multiple infrared output curves 1320 that represent different tunings of IR emitters 360, 560, 1010. FIG. 14 illustrates IR transmissions for opaque ceramic glass which has two passbands, each of which are smaller than the passbands of the non-tinted glass of FIG. 13. FIG. 14 also shows three IR output curves 1410, 1420 and 1430, which represent different tunings that can be applied to an IR emitter to align IR from the emitter with passbands of the ceramic glass.

FIG. 15 illustrates an embodiment of a process 1500 for manufacturing float glass. In an automated system, parameters for a desired type of glass are input into a controller at S1510. The parameters may be time and temperature parameters for various phases of the process, or more generally, a desired type of glass or characteristics of a desired glass such as a desired thickness, size or heat treatment. An appropriate tank may be selected at S1515 when multiple different tanks are available to select a size of a glass sheet, and a thickness may be selected at S1520. The selected thickness may be achieved by providing a predetermined amount of glass to a specific size of tank, and in some embodiments, by applying a predetermined amount of pressure when forming the glass. Accordingly, embodiments of the present application may be used to form sheets of glass with thicknesses that are less than one quarter of an inch, e.g. glass that is less than 6 mm, 5 mm, 4 mm 3 mm or 2 mm thick.

The tank 102 is heated at S1525. Heating the tank 102 may include activating radiant emitters in the tank to heat tin in the tank to a temperature of 600° C. or more, 650° C. or more, 700° C. or more, 750° C. or more, 800° C. or more, 850° C. or more, 900° C. or more, or 950° C. or more. An advantage of using resistive radiant heaters is the ability to heat materials rapidly and efficiently in the tank 102 to high temperatures. Efficiency is greatly enhanced compared to a lehr oven due to the highly directional heating provided by the radiant emitters, their relatively close proximity to the materials that are heated, and the relatively low mass of tin used by an embodiment of the present disclosure. Accordingly, a mass of tin that is sufficient to create float glass in a tank 102 may be heated to temperatures of 950° C. or more in several minutes or less, while it can take a day or more for a lehr to bring the tin bath to a temperature of 600° C. The tin may be heated using one or more of radiant emitters 360 in the bottom assembly 130 of the tank, radiant emitters 560 in side assemblies 120 of the tank, and radiant emitters 1010 in the top cover 150.

Molten glass is introduced into the tank 102 at S1535. The molten glass may be introduced to an open top of the tank 102 with the top cover 150 removed, or introduced into an orifice that is provided in the top cover 150 or an upper portion of the side assemblies 120. The mass of glass introduced into the tank may be measured by load cells 950. In an embodiment, glass may be melted in a batch process by measuring an amount of solid materials appropriate for the desired size of glass sheet, melting those materials as a single batch, and introducing the melted batch of glass into the tank.

After the glass has been introduced into the tank at S1535, a predetermined pressure may be applied to the environmental chamber 160 by introducing or removing non-oxidizing gas from the chamber. The glass is allowed to spread to an even thickness at S1545/S1550. The glass is then cooled to a solid state. The rate of cooling may be chosen at S1555 based on whether a tempered or an annealed glass is desired. In the case of tempered glass, the glass is cooled rapidly at S1570. Cooling the glass may include removing heat using fluid in one or more of fluid channels 322, 590 and 1070, and/or introducing gas into one or more of gas jets 321, 580 and 1060. The glass may be cooled to a temperature of about 250° C., at which the glass can be grasped by a suction system and lifted from the tank.

After it has been removed from the tank, the sheet of glass may be set aside and allowed to cool to room temperature. Depending on the desired size of a sheet of glass and the condition of edges of the sheet, edges of the sheet of glass may be trimmed at S1590.

Figure 16C:
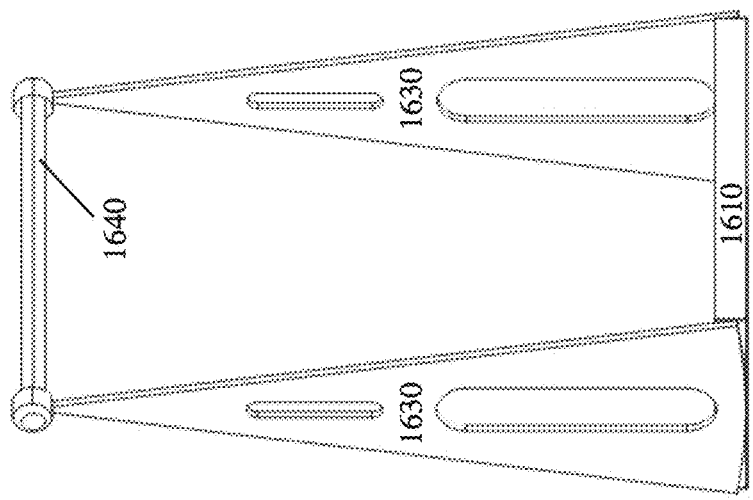
FIGS. 16a, 16b and 16c are various views of an embodiment of a centrifugal acceleration apparatus to swing a tub of tin and molten glass in a vertical circle to cause the molten glass to form a radius of curvature while cooling.
Figure 16A:
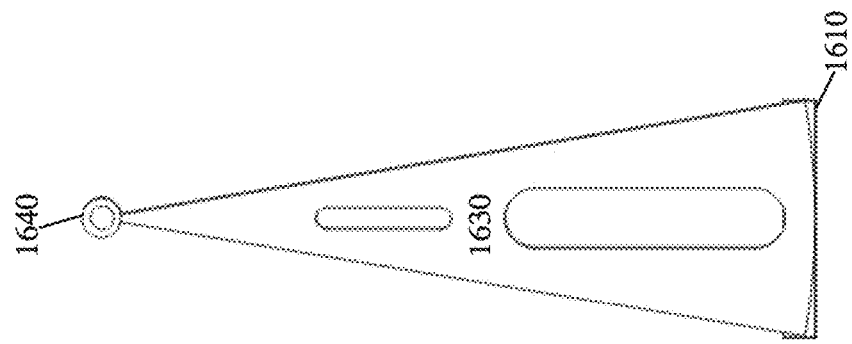
Figure 16B:
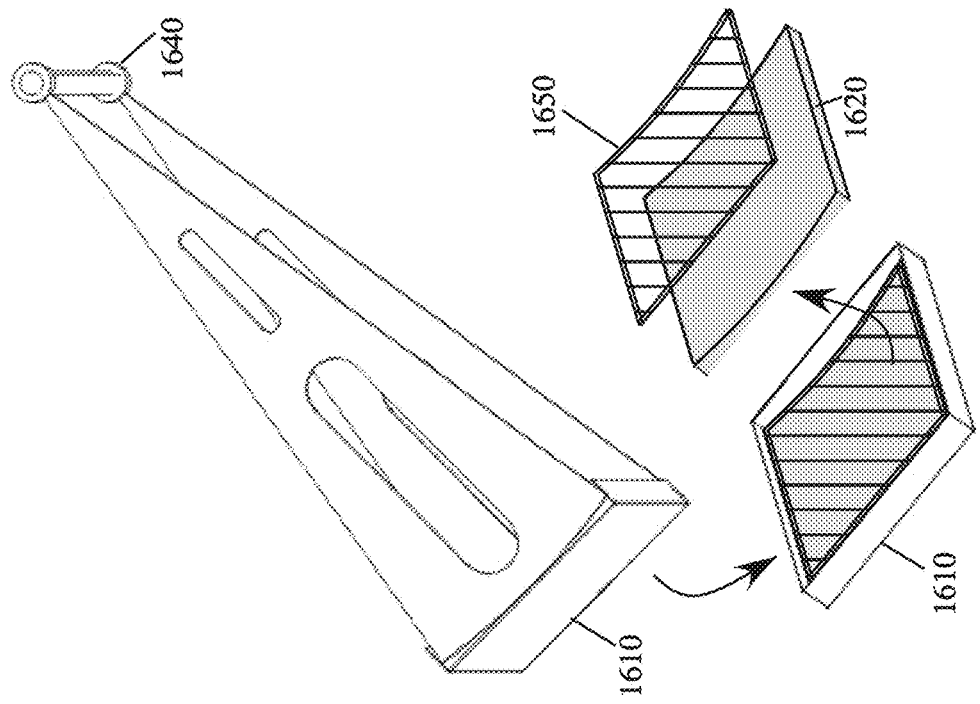

FIGS. 16a, 16b and 16c illustrate an embodiment of an apparatus for producing a curved sheet of glass. The reduced viscosity of the tin and the reduced annealing time enable a curved glass process of the present disclosure such that curved glass can be formed in one step. In such a process, the radius of curvature-length side arms 1630 (which may be dynamically adjustable) support the tank assembly (not shown) containing the molten tin tank 1610, the molten tin 1620 and the molten glass layer 1650. In a process of the present disclosure, the tank (not shown), the tub 1610, the tin 1620 and the glass layer 1650 are rotated about axle 1640 using a Cartesian-shaped acceleration curve and an average velocity (as disclosed in U.S. Pat. No. 10,543,435) that will subject the tin and the glass to a constant radial force that will curve the tin and the glass to a desired radius of curvature.

In one implementation, an apparatus for producing float glass comprises a tank, and the tank comprises a tub with a bottom and four sides, the tub having a usable temperature of at least 950° C., four side assemblies, a bottom assembly including a first plurality of infrared emitters directed towards the tub, and a top cover assembly including a second plurality of infrared emitters directed towards the tub. The bottom of the tub may comprise a material with a transmissivity of at least 30% in a first frequency of the infrared spectrum, and the infrared emitters emit radiation in frequencies corresponding to the first frequency. The material of the tub may pass at least 50% of infrared energy in the first frequency. Emitters of the first plurality of infrared emitters may be disposed in openings in a layer of refractory material included in the bottom assembly.

In the implementation, an outer surface of each of the side assemblies is a sheet of metal or ceramic material, and a side support assembly is coupled to each respective sheet. Each side support assembly may be configured to hold the respective side assembly in place against adjacent side assemblies and the bottom assembly. The side support assemblies may have at least three degrees of freedom of adjustability.

In the implementation, each of the side assemblies comprises a plurality of layers of refractory material that are fitted over protrusions that are fixed to a side plate that is an outer layer of the side assembly. The bottom assembly may include a plurality of layers of refractory material that are fitted over structures that protrude from a bottom plate of the bottom assembly. The implementation may further include an environmental chamber surrounding the tank, and the side assemblies may have trapezoidal shapes in which the width of the trapezoidal shapes increases with height. A depth of the tub may be no more than 16 inches.

The invention claimed is:

1. A method of forming a sheet of float glass, the method comprising:
   providing a predetermined volume of tin to a tub in a tank, the tub comprising a material with a transmissivity of at least 30% in a first frequency of the infrared spectrum;
   activating a first plurality of infrared emitters to transmit infrared energy in the first frequency to heat the tin to a temperature above 600° C.;
   introducing molten glass onto an exposed surface of the heated tin; and
   cooling the molten glass to a solid state; and
   removing the solid glass sheet from the tub.

2. The method of claim 1, further comprising:
   placing a top cover over the tub, the top cover comprising a second plurality of infrared emitters; and
   activating the second plurality of infrared heaters to provide heat to the molten glass.

3. The method of claim 1, further comprising:
   filling an environmental chamber containing the tank with a non-oxidizing gas.

4. The method of claim 3, further comprising:
   thinning the molten glass by pressurizing the environmental chamber using the non-oxidizing gas.

5. The method of claim 1, wherein cooling the molten glass comprises providing a gas to at least one of a side assembly, a top assembly, and a top cover of the tank.

6. The method of claim 1, wherein cooling the molten glass comprises providing a heat exchange fluid to a fluid channel disposed in at least one of a side assembly, a top assembly, and a top cover of the tank.

7. The method of claim 1, wherein removing the solid sheet of glass comprises:
   removing a top cover from the tank;
   moving a mechanical apparatus including a suction device over the tank;
   lowering the suction device into contact with the sheet of glass and applying suction; and
   lifting the sheet of glass out of the tank.

8. The method of claim 1, wherein the tin is heated to a temperature of at least 800° C.

9. The method of claim 1, wherein the tin is heated to a temperature of at least 900° C.

10. The method of claim 1, wherein the molten glass is cooled at a rate sufficient to anneal the glass.

11. The method of claim 1, wherein the molten glass is cooled at a rate sufficient to temper the glass.

12. The method of claim 1, wherein a depth of the tin is no more than six inches when the tin is at a temperature of 650° C.

13. The method of claim 1, wherein a groove is disposed in a side of the tub at a position that corresponds to a location of an edge of the molten glass after the molten glass has spread over the surface of the heated tin.

14. The method of claim 13, wherein edges of the molten glass cool to have a shape of the groove, and a depth of the groove is less than an amount of shrinkage experienced by the solid glass sheet so that when the solid glass sheet is removed, the solid glass sheet has finished edges.

15. The method of claim 1, further comprising:
   melting a predetermined amount of glass to provide the molten glass that is introduced onto the heated tin in a single batch.

16. A method of forming a sheet of float glass, the method comprising:
   melting a pool of tin in a tub of a tank, the tub comprising a material with a transmissivity of at least 30% in a first frequency of the infrared spectrum;
   activating a first plurality of infrared emitters to transmit infrared energy in the first frequency to heat the tin to a temperature above 600° C.;
   introducing molten glass onto an exposed surface of the heated tin;
   placing a top cover over the tub, the top cover comprising a second plurality of infrared emitters;
   activating the second plurality of infrared heaters to provide heat to the molten glass; and
   after the molten glass has spread over the exposed surface of the heated tin, cooling the molten glass to a solid state and removing the solid glass sheet from the tub.

17. The method of claim 16, further comprising:
   filling an environmental chamber containing the tank with a non-oxidizing gas; and
   pressurizing the environmental chamber using the non-oxidizing gas to spread the molten glass over the heated tin.

18. The method of claim 17, wherein pressurizing the environmental chamber causes the molten glass to spread across the surface of the heated tin, thereby reducing a thickness of the molten glass.

19. The method of claim 16, wherein cooling the molten glass comprises one or both of:
   1) providing a gas to at least one of a side assembly, a top assembly, and a top cover of the tank, and
   2) providing a fluid to at least one of a side assembly, a top assembly, and a top cover of the tank.

20. The method of claim 19, wherein the molten glass is cooled at a rate sufficient to temper the glass.

* * * * *